(12) United States Patent
Ito

(10) Patent No.: US 6,990,334 B1
(45) Date of Patent: Jan. 24, 2006

(54) WIRELESS INFORMATION COMMUNICATION METHOD AND ITS DEVICE

(75) Inventor: Seigo Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/136,822

(22) Filed: Aug. 19, 1998

(30) Foreign Application Priority Data

Aug. 21, 1997 (JP) ................................. P9-225435

(51) Int. Cl.
*H04M 11/10* (2006.01)

(52) U.S. Cl. ............................... 455/414.3; 455/552.1; 455/556.1; 455/557; 455/566

(58) Field of Classification Search ............. 455/414.2, 455/414.3, 456.1, 456.3, 457, 552.1, 556.1, 455/557, 566, 567, 569.1, 569.2
See application file for complete search history.

(56) References Cited

U.S. PATENT DOCUMENTS

| | | | |
|---|---|---|---|
| 5,132,992 A | 7/1992 | Yurt et al. ................... 375/122 |
| 5,150,113 A * | 9/1992 | Bluthgen ............... 340/825.69 |
| 5,291,554 A | 3/1994 | Morales ......................... 380/5 |
| 5,303,393 A | 4/1994 | Noreen et al. ................ 455/3.2 |
| 5,457,454 A * | 10/1995 | Sugano ........................ 341/22 |
| 5,510,801 A | 4/1996 | Engelbrecht et al. ........ 342/457 |
| 5,530,754 A | 6/1996 | Garfinkle ....................... 380/5 |
| 5,572,442 A | 11/1996 | Schulhof et al. ............. 364/514 |
| 5,633,872 A | 5/1997 | Dinkins ....................... 370/312 |
| 5,671,226 A * | 9/1997 | Murakami et al. .......... 370/474 |
| 5,694,467 A * | 12/1997 | Young, III ................... 379/430 |
| 5,819,160 A * | 10/1998 | Foladare et al. .............. 455/45 |
| 5,991,737 A * | 11/1999 | Chen ........................... 705/26 |
| 5,999,126 A | 12/1999 | Ito ........................... 342/357.1 |
| 6,246,672 B1 * | 6/2001 | Lumelsky ................... 370/310 |
| 6,300,880 B1 * | 10/2001 | Sitnik ..................... 340/825.25 |

FOREIGN PATENT DOCUMENTS

| | | |
|---|---|---|
| EP | 0782364 | 7/1997 |
| EP | 0786876 | 7/1997 |
| JP | 0879381 | 3/1996 |
| WO | WO9525409 | 9/1995 |

* cited by examiner

*Primary Examiner*—Temica Beamer
(74) *Attorney, Agent, or Firm*—Jay H. Maioli

(57) ABSTRACT

A wireless acoustic transmission device used in an acoustic offering service having superior convenience, includes wireless transmitter for transmitting the service request signal to request the desired acoustic signal, a wireless receiver for receiving the transmission signal containing the acoustic signal to be transmitted in response to the service request signal, a demodulator and decoder for restoring the acoustic signal applying the demodulation and/or decoding processing to the receiving signal transmitted from the wireless receiver, and an electro-acoustic transformer for transforming the acoustic signal restored by the demodulator and decoder the radio waves and for outputting. Accordingly, the desired acoustic signal can be easily obtained without having the recording medium on which the acoustic signal is recorded, and the acoustic offering service having superior convenience can be realized.

30 Claims, 17 Drawing Sheets

```
1  LATEST BEST TEN   (J-POP)
2  LATEST BEST TEN   (ROCK)
3  LATEST BEST TEN   (ENKA)
4  RANDOM PICKUP     (1990S)
5  RANDOM PICKUP     (1980S)
6  RANDOM PICKUP     (1960-70S)
7  JAZZ RANDOM
8  CLASSIC RANDOM
9  REGGAE RANDOM
0  PROGRAM MODE
```

```
File_name="Fav1"
Title_of_1="Highway ○×△"
Code_of_1=225920
Title_of_2="１ ７ × ×"
Code_of_2=163760
        :
```

WIRELESS INFORMATION COMMUNICATION METHOD AND ITS DEVICE

BACKGROUND OF THE INVENTION

1. Field of the Invention

This invention relates to a wireless information communication method and its device, and more particularly, is applicable to such as an acoustic receiving device for receiving music data via wireless circuit.

2. Description of the Related Art

In recent years, peoples frequently listen to musics and other information on the move. For example, a compact radio equipment and a headphone stereo device equipped with a cassette tape, a mini disc or a compact disc have come into widespread use in recent years and the users can listen to the radio broadcasting or music in the commuter train carrying these equipments with them. Also, it is being widely practiced that the user listens to radio broadcasting using the car radio equipment while he is driving the car, or he listens to music by playing back the music recorded on the recording medium such as cassette tape, mini disc or compact disc, using the car audio device.

However, in the conventional information acquisition method on the move, its usability is not sufficient for the user. For example, in the case of radio broadcasting, since this is the broadcasting for the general public, it cannot reflect the personal taste of information and music, and this causes the inconvenience since the user has to listen to the talk or music that he does not want to hear. Moreover, in the method to reproduce the music from the recording medium, the personal taste can be reflected to the contents listening, such as music, however, it is necessary to purchase or edit the recording medium, and it causes problems because it becomes necessary to have more time, expense and the storage place, and if the recording medium is produced or purchased, it becomes obsolete or the user gets tired of hearing the same music repeatedly.

As a method to solve such problems, a method for offering information and music service using the wireless telephone such as PHS (personal handy-phone system, that is simplified portable telephone system) has been proposed in the Japanese Patent Application No. 207433/1996, and according to this method, weak points described above can be completely solved and the information offering service reflecting personal tastes can be realized without the recording medium.

However, the wireless telephone circuit of PES has the reproduction frequency band narrower than the music reproduction method using the recording medium such as ordinary compact disc and mini disc, and furthermore, its communication conditions are not necessarily satisfactory. Accordingly, the music offering method using the wireless telephone circuit has inferior sound quality as compared with the method by the reproduction from the recording medium and the high speed transmission rate cannot be obtained steadily due to various disturbances such as fading. The Japanese Patent Application No. 207433/1996 has dealt with this point by switching the frequency characteristics or switching the signal output system from stereo to monophonic. However, this only changes the sound quality and the contents of service, and it is still insufficient in operability from the user's point of view.

SUMMARY OF THE INVENTION

In view of the foregoing, an object of this invention is to provide a wireless information communication method and its device having further improved operability.

The foregoing object and other objects of the invention have been achieved by the provision of a wireless information communication method and its device.

According to this invention, a wireless acoustic receiving device comprises: wireless transmission means for transmitting a service request signal to request the desired acoustic signal; wireless receiving means for receiving a transmission signal containing the acoustic signal to be transmitted responding to the service request signal; demodulation/decoding means for applying the demodulation and/or decoding processing to the receiving signal transmitted from the wireless receiving means; and electro-acoustic transform means for transforming the acoustic signal restored by the demodulation/decoding means to a sound wave to be output.

Further, a vehicle-loaded acoustic device, comprises: wireless transmission means for transmitting a service request signal to request the desired acoustic signal; wireless receiving means for receiving transmission signal containing the acoustic signal to be transmitted responding to the service request signal; demodulation/decoding means for restoring the acoustic signal by applying the demodulation and/or decoding processing to the receiving signal transmitted from the wireless receiving means; and electro-acoustic transform means having at least two or more electro-acoustic transform elements, for transforming the acoustic signal restored by the demodulation/decoding means to a sound wave to be output in stereo sound.

Further, a portable acoustic output device, comprises: wireless transmission means for transmitting a service request signal to request the desired acoustic signal; wireless receiving means for receiving a transmission signal containing the acoustic signal to be transmitted responding to the service request signal; demodulation/decoding means for restoring the acoustic signal upon applying the demodulation and/or decoding processing to the receiving signal transmitted from the wireless receiving means; electro-acoustic transform means having at least two or more electro-acoustic transform elements, for transforming the acoustic signal restored by the demodulation/decoding means to a sound wave to be output in stereo sound; and a battery for driving.

Further, a wireless information retransmission device, comprises: wireless transmission means for transmitting a service request signal to request the desired acoustic signal; wireless receiving means for receiving a transmission signal containing the acoustic signal to be transmitted responding to the service request signal; demodulation/decoding means for restoring the acoustic signal by applying the demodulation and/or decoding processing to the receiving signal transmitted from the wireless receiving means; re-modulation means for re-modulating and transmitting the acoustic signal transmitted from the demodulation/decoding means; and retransmission means for retransmitting the output signal of the re-modulation means.

Further, a portable acoustic output communication device, comprises: wireless transmission means for transmitting a service request signal to request the desired acoustic signal; wireless receiving means for receiving a transmission signal containing the acoustic signal to be transmitted responding to the service request signal; demodulation/decoding means for restoring the acoustic signal by applying the demodulation and/or decoding processing to the receiving signal sent out from the wireless receiving means; electro-acoustic transform means having at least two or more human body-attachable type electro-acoustic transform elements, for transforming the acoustic signal restored by the demodulation/decoding means to a sound wave and outputting in stereo sound; and a battery for driving. While a telephone call is in progress, the vibrations of a part of human body or the voice of a sender is detected by the electro-acoustic transform element of the electro-acoustic transform means to form audio signal and the audio signal is transmitted via the wireless transmission means, and the audio signal from the other party of the call is received by the wireless receiving means to be output this from the electro-acoustic transform element of the electro-acoustic transform means, so that both the sound receiving and the telephone call can be conducted.

Further, an automobile comprises: wireless transmission means for transmitting a service request signal to request the desired acoustic signal; wireless receiving means for receiving a transmission signal containing the acoustic signal to be transmitted responding to the service request signal; demodulation/decoding means for restoring the acoustic signal by applying the demodulation and/or decoding processing to the receiving signal sent out from the wireless receiving means; and electro-acoustic transform means having at least two or more electro-acoustic transform elements, for transforming the acoustic signal restored by the demodulation/decoding means to a sound wave and outputting it in stereo sound.

Further, an information transmission device comprises: information source coding means for information source coding the input signal; feature extracting means for extracting the feature information of the input signal; quantization means for vector quantizing the output data of the information source coding means using the feature information extracted by the feature extracting means; modulation means for modulating the output signal of the quantization means; wireless transmission means for transmitting the output signal of the modulation means to a terminal device; wireless receiving means for receiving the output signal from the terminal device; and demodulation means for applying the demodulation and/or decoding processing to the receiving signal sent out from the wireless receiving means. The contents of the input signal are changed based on the contents of output signal of the demodulation/decoding means.

Further, a wireless acoustic receiving method, comprises the steps of: transmitting a service request signal for requesting the desired acoustic signal; receiving a transmission signal containing the desired acoustic signal to be transmitted responding to the service request signal; restoring the acoustic signal by applying the demodulation and/or decoding processing to the received signal; and outputting the restored acoustic signal upon transforming to a sound wave.

Further, a wireless acoustic receiving method, comprises the steps of: separating main information and sub information from the receiving signal; restoring feature information from the sub information; and restoring the main information using the restored feature information, and by information source decoding the restoration result, restoring the acoustic signal from the receiving signal.

Further, a wireless acoustic receiving method, comprises the steps of: transmitting a service request signal to request the desired acoustic signal; receiving a transmission signal containing the acoustic signal to be transmitted responding to the service request signal; restoring the acoustic signal by applying the demodulation and/or decoding processing to the receiving signal received; retransmitting the restored acoustic signal upon re-modulating; and receiving the retransmitted acoustic signal to be demodulated and transforming the acoustic signal to a sound wave to be output.

Further, a wireless information retransmission method, comprises the steps of: transmitting a service request signal to request the desired acoustic signal; receiving a transmission signal containing the acoustic signal to be transmitted responding to the service request signal; restoring the acoustic signal by applying the demodulation and/or decoding processing to the receiving signal received; and retransmitting the restored acoustic signal upon re-modulating.

Further, a portable acoustic output communication method, comprises the steps of: transmitting a service request signal to request the desired acoustic signal; receiving transmission signal containing the acoustic signal to be transmitted responding to the service request signal; restoring the acoustic signal by applying the demodulation and/or decoding processing to the receiving signal received; transforming the restored acoustic signal to a sound wave using the predetermined electro-acoustic transform element and outputting this; and during a telephone conversation, detecting the vibration of a part of human body or the voice of a sender by the electro-acoustic transform element to form the audio signal to be output, and receiving the audio signal from the other party to output this from the electro-acoustic transform element.

Further, an information transmission method, comprises the steps of: information source coding the input signal, and extracting the feature information of the input signal; conducting the vector quantization onto the output data based on the information source coding in utilizing the feature information; modulating an output signal based on the vector quantization, and transmitting it to a terminal device; receiving transmission signal from the terminal device; and restoring the data transmitted from the terminal device after applying the demodulation and/or decoding processing to the receiving signal received, and changing the contents of the input signal based on the contents of the data.

Further, a music transmission method, comprises the steps of: receiving a request signal from the terminal device; if the request signal is the first type signal, transmitting musics in the order predetermined at the transmitting end; and if the request signal is the second type signal, transmitting an optional music upon selecting from among the predetermined music group.

Further, a music transmission method, comprises the steps of: receiving a request signal from the terminal device; if the request signal is the first type signal, transmitting musics in the order predetermined at the transmitting end; and if the request signal is the second type signal, transmitting music determined at the terminal device side.

Further, a music transmission device, comprises: receiving means for receiving a request signal from the terminal device; and music information transmission means which transmits musics in the order predetermined if the request signal is the first type signal, and transmits the music after selecting an optional music from among the prescribed music group if the request signal is the second type signal.

Further, a music transmission device, comprises: receiving means for receiving a request signal from the terminal device; and music information transmission means which transmits the music in the predetermined order if the request signal is the first type signal, and if the request signal is the second type signal, transmits the music determined at the terminal device side.

Further, a music receiving device, comprises: transmission means for transmitting the first request signal which requests the music transmission without specifying music or the second request signal which requests the music transmission specifying music; and receiving means for receiving the music signal transmitted responding to the first or the second request signal.

Further, a music receiving device, comprises: transmission means for transmitting a request signal to request the music transmission; receiving means for receiving the music signal responding to the request signal; extracting means for extracting the add-on information transmitted with the music signal from the output signal of the receiving means; and display means for selectively displaying the add-on information of the first type and the add-on information of the second type from among the add-on information.

Further, an information selecting method, comprising the step of: displaying the information on which a virtual cursor is positioned by moving the virtual cursor on the two-dimensional information table in response to the input operation; and when the confirmation command is entered, selecting the information on which the virtual cursor is positioned.

Further, a character input method, comprising the steps of: displaying the character on which a virtual cursor is position by moving the virtual cursor on the two-dimensional information table in response to the input operation; and when the confirmation command is entered, selecting the character on which the virtual cursor is positioned.

Further, the data construction for specifying music data, characterized by: having at least one or more units data pairing the music name with the music code added to the music; and arranging the unit data in the desired order, and based on that order, the time sharing order of the music is specified.

Furthermore, a music specification method in utilizing the communication circuit, comprises the steps of: transmitting material information for specifying music via the predetermined communication circuit; receiving the music list matching to the material information via the communication circuit; and specifying the desired music from among the music list and transmitting the information showing the specified music via the communication circuit.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) The First Embodiment (1-1) Construction of Music Offering Service System

Figure 1:
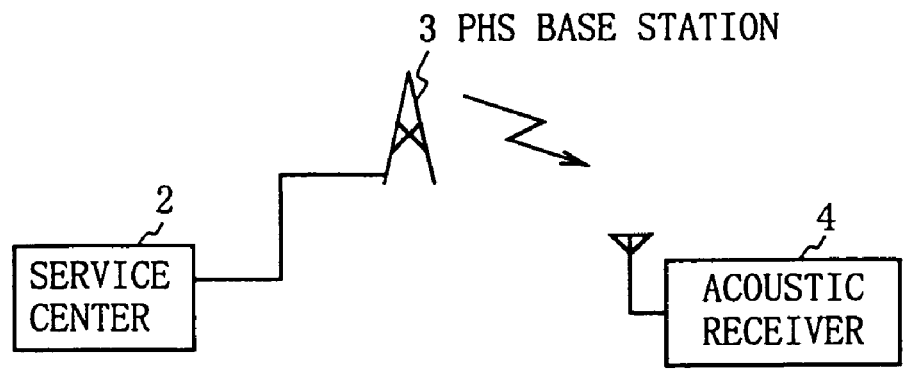
FIG. 1 is a block diagram showing the construction of a music offering service system according to the present invention.

In FIG. 1, 1 generally shows a music offering service system according to the present invention, and this system is roughly comprised of a service center 2, a PHS base station 3 and an acoustic receiver device 4. The service center 2 is the source of dispatching the music signal to offer and transmits music signal of the music that the user having the acoustic receiver device desires to the PES base station 3. The PHS base station 3 is a base station device of PHS (personal handyphone system, i.e., simple portable telephone system) and it transmits music signal supplied from the service center via the PHS wireless circuit.

The acoustic receiver device 4 is a device in which the construction for receiving the music offering service is added to the PHS telephone terminal device, and receiving the music signal transmitted from the PES base station 3, outputs this to the electro-acoustic transform means. Thus, the user having the acoustic receiver device 4 can receive and hear the music signal offered by the service center 2 and can hear the desired music without the recording medium such as mini disc and compact disc.

In this connection, in the case of receiving the music offering service, firstly, a service request signal showing such as music type is transmitted to the PES base station 3 via the PHS wireless circuit. Receiving this, the PES base station transmits this service request signal to the service center 2. Thus, the service center 2 can grasp the music which the user wants to hear based on this service request signal and after reproducing the music signal of that music, can transmit this.

(1-2) General Construction of Acoustic Receiver Device

Figure 2:
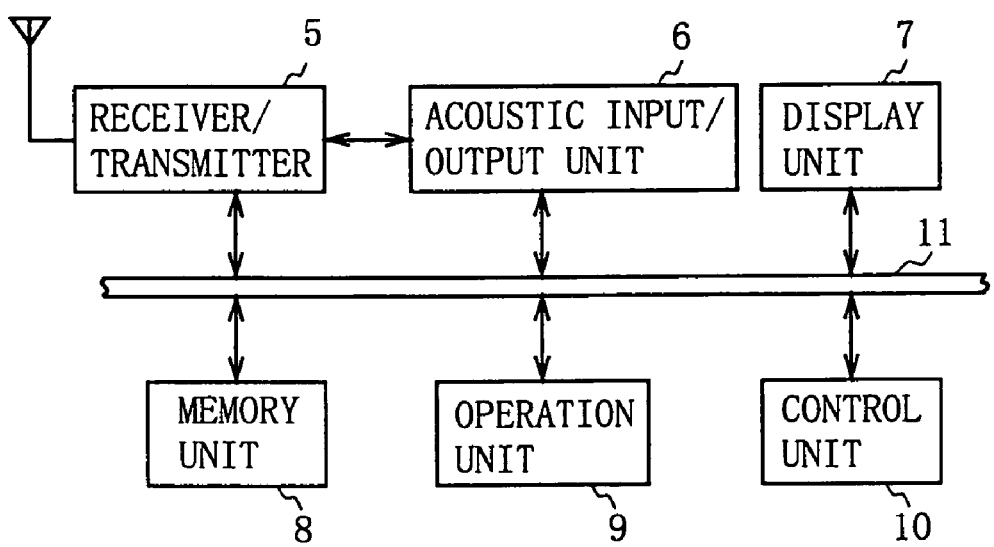
FIG. 2 is a block diagram showing the construction of an acoustic receiver device.

In FIG. 2, 4 generally shows an acoustic receiver device according to the present invention, and this is roughly comprised of a receiver/transmitter unit 5, an acoustic input/output unit 6, a display unit 7, a memory unit 8, an operation unit 9 and a control unit 10.

The receiver/transmitter unit 5 is a wireless receiver/transmitter unit fully compliant with the standard of PHS and this is a circuit block which transmits and receives audio signal for conversation between the PHS base station 3 via the PHS wireless circuit, or receives the music signal transmitted from the PHS base station 3 via the PHS wireless circuit as the music offering service.

The acoustic input/output unit 6 is an input/output interface of the audio signal and music signal to the receiver/transmitter unit 5, and as well as collecting the audio signal for telephone call by a microphone and outputting the audio signal from the other party by a speaker, outputs the music signal received as the music offering service via the stereo-capable speaker or earphone.

The display unit 7 is comprised of such as a liquid crystal display, and as well as displaying various kinds of data such as the telephone numbers of the telephone call partner and his own, the name of the other party, or the wave receiving condition and the battery condition when the acoustic receiver device 4 is utilized as a telephone terminal, displays data such as the title and words of the music (this data is transmitted from the service center 2 with the music signal) when receiving the music offering service.

Moreover, the memory unit 8 is comprised of a memory and memorizes various data required for the telephone terminal such as the telephone numbers registered as abbreviated dials and the name and the telephone number of the other party registered as the telephone directory list, or the telephone number of his own station, and various kinds of data such as the music code and the music order required for receiving the music offering service are memorized. Furthermore, the operation unit 9 is comprised of such as numeric keys and other operation keys. The operation command from the user (specifically, the operation command when making a call or receiving a call and the operation command when receiving the music offering service) to this acoustic receiver device 4 can be entered via the numeric keys and the other operation keys.

The control unit 10 is a control block for controlling the overall operation of this acoustic receiving device 4 and adapted to control the operation of each unit supplying the control data to each unit via a data bus 11. Moreover, the control unit 10 memorizes various kinds of data in the memory unit 8 via the data bus 11 or reads out various data from the memory unit 8, or receives the control data showing the operation command entered from the operation unit 9 via the data bus 11 and conducts the operation control based on this.

Figure 3:
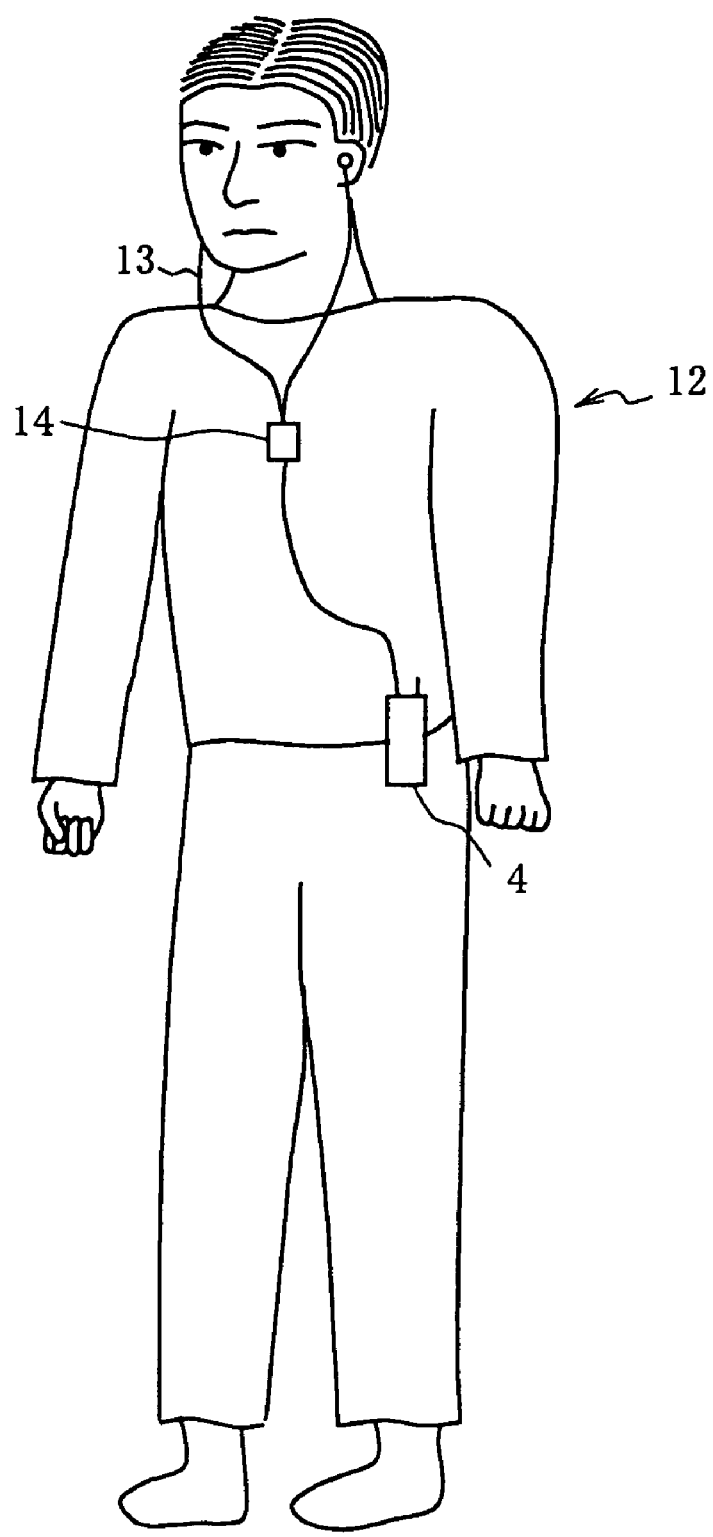
FIG. 3 is a sketch explaining the usage pattern of an acoustic receiver device.

At this point, the actual usage pattern of the acoustic receiver 4 having the construction described above will be shown in FIG. 3. In this example shown in FIG. 3, since the acoustic receiver 4 is driven by a battery, the acoustic receiver 4 can be used by the user taking it on the road. In this case, the user, upon fixing the acoustic receiver 4 to his belt using a carrying case, listens to the music signal received by using a stereo-capable earphone 13 as the electro-acoustic transform means for music signal output described above. Thus, the user 12 can hear the desired music with the sense of near-empty handed even moving on the road.

In this example, the operation unit 9 is not only provided in the main body but also the operation unit 9 is placed on the cable of the earphone 13 (i.e., on the cable to connect the electro-acoustic transform means and the acoustic receiver 4) as a remote operator 14. With this arrangement, the user 12 can conduct the operation on hand when receiving the music offering service and can receive the music offering service without operating the operation unit 9 provided in the main body of the acoustic receiver device 4. In this connection, in the remote operator 14, not only the operation unit 9 but also the display unit are provided integrated as in the case of display unit 7 provided in the main body, and thus, the user can see information regarding the acoustic signal to be received as will be described later by operating the remote operator 14 without seeing the display unit 7 of the main body.

(1-3) Construction of Receiver/Transmitter unit

Figure 4:
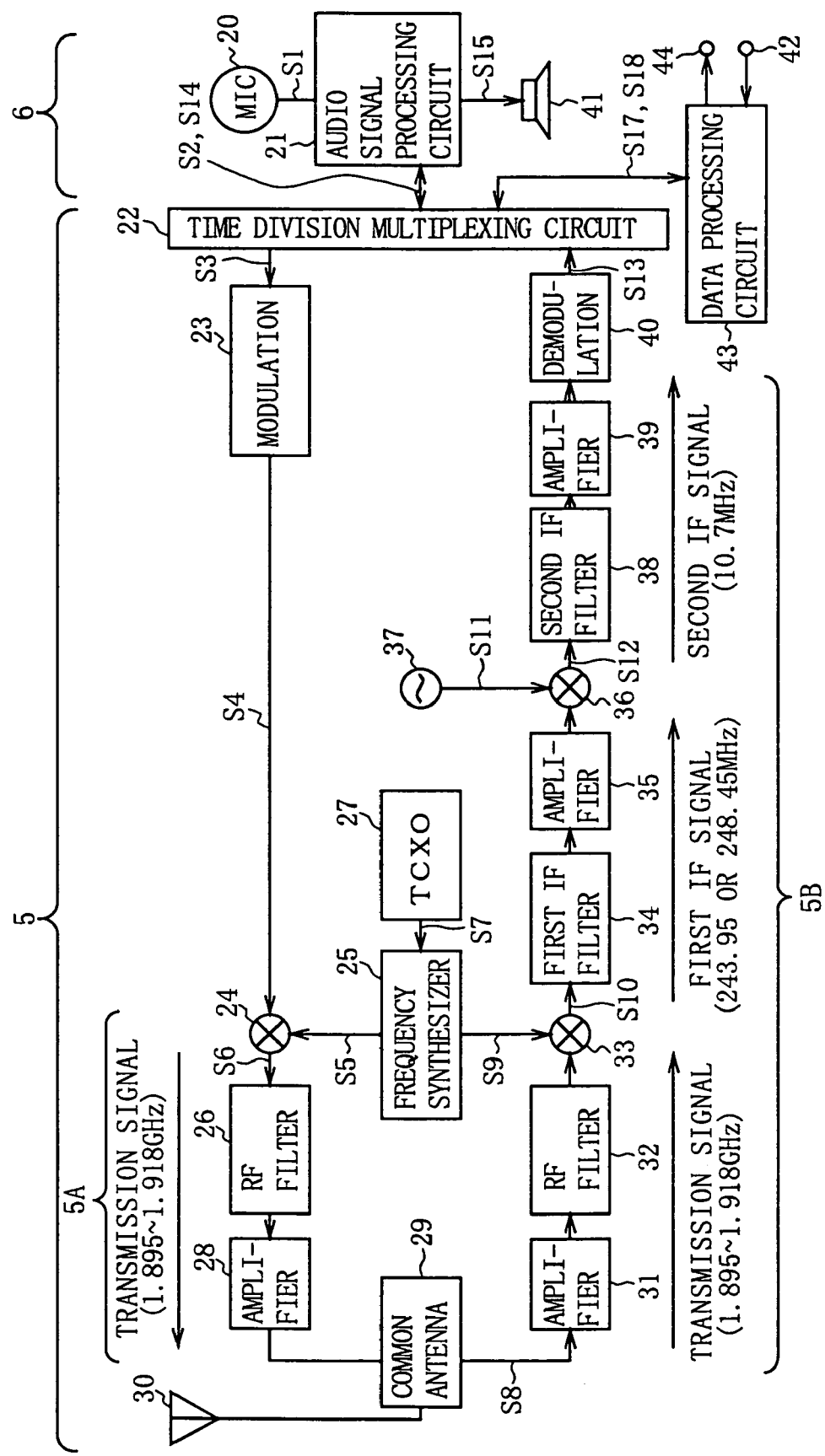
FIG. 4 is a block diagram showing the construction of the receiver/transmitter unit of the acoustic receiver device.

Then, in this chapter the receiver/transmitter unit 5 described above will be explained more specifically. As shown in FIG. 4, the receiver/transmitter unit 5 comprises a wireless transmitter 5A and a wireless receiver 5B and conducts the data transmission and reception by means of these wireless transmitter 5A and wireless receiver 5B via the PHS wireless circuit.

In this receiver/transmitter unit 5, for example, during telephone conversation, audio signal S1 entered by a microphone 20 of the acoustic input/output unit 6 is received via the audio signal processing circuit 21. In this case, the microphone 20 is comprised of electro-acoustic transform elements and transforms the collected sound waves of the user 12 to an electrical audio signal S1 by conducting the electro-acoustic transform processing. Moreover, the audio signal processing circuit 21 conducts the prescribed coding processing based on the coding system of Adaptive Differential Pulse Code Modulation (ADPC) to the inputted audio signal S1 and outputs the resulting coded audio data S2 to the receiver/transmitter unit 5.

The receiver/transmitter unit 5 supplies this coded audio data S2 to the time division multiple circuit 22. The PHS wireless circuit adopts the Time Division Multiple Access/Time Division Duplex system (TDMA/TDD system) and conducts the transmission and reception alternatively at the timing of time slot allocated to its own station in advance. Accordingly, the time division multiplexing circuit 22 is provided in this receiver/transmitter unit 5, and as well as storing the transmission data in the transmission slot assigned to its own station by this time division multiplexing circuit 22, the receiver/transmitter unit 5 can take out the receiving data from the receiving slot assigned to own station.

The time division multiplexing circuit 22, storing the coded audio data to be supplied from the audio signal processing circuit 21 in the transmission slot assigned to its own station, forms a transmission burst data S3 and outputs this to the modulation circuit 23. The modulation circuit 23 forms a transmission signal S4 of the base band by applying the modulation processing of such as Quadrature Phase Shift Keying (QPSK) modulation and outputs this to a mixer circuit 24. In this connection, since the transmission burst data S3 is a burst signal, this transmission signal S4 is also burst signal.

The mixer circuit 24 frequency converts the transmission signal S4 of 1.9 GHz to transmission signal S6 by multiplying the local signal S5 to be supplied from the frequency synthesizer 25 by the transmission signal S4 and outputs that transmission signal S6 to a RF filter 26. In this connection, the frequency synthesizer 25 forms the local signal S5 with the desired frequency based on the oscillation output S7 sent out from a temperature compensated crystal oscillator (TCXO) 27. Thus, in the mixer circuit 24, the transmission signal S6 having the desired frequency can be formed using the local signal S5 of the desired frequency.

The transmission signal S6 sent out from the mixer circuit 24, after unnecessary elements in the transmission signal S6 are eliminated by the RF filter, is amplified to the predetermined electric power by the RF amplifier 28 and supplied to an antenna 30 via an antenna multicoupler 29. Thus, the transmission signal S6 corresponding to the audio signal S1 is transmitted from the antenna 30.

On the other hand, the receiving signal S8 of 1.9 GHz received by the antenna 30, after being separated from the transmission signal S6 by the antenna multicoupler 29, is amplified by the RF amplifier 31 and entered into the RF filter 32. As it is clear from the description heretofore explained, the antenna multicoupler 29 is a circuit to separate transmission signal S6 and receiving signal S8, and providing this antenna multicoupler 29, one antenna 30 can be used commonly for transmitting and receiving.

The RF filter 32 eliminates unnecessary elements contained in the receiving signal S8 and outputs this to a mixer circuit 33 of the later stage. The mixer circuit 33, multiplying the local signal S9 supplied from the frequency synthesizer 25 by the receiving signal S8, frequency converts the receiving signal S8 to the first intermediate frequency signal S10 of such as 243.95 MHz or 248.45 MHz and outputs this first intermediate frequency signal S10 to the first IF filter 34. In this case, since unnecessary elements contained in the receiving signal S8 are eliminated by the RF filter 32, the occurrence of mixed modulation distortion can be prevented when the frequency conversion processing is conducted at the mixer circuit 33.

The first IF filter 34, after eliminating unnecessary elements contained in this first intermediate frequency signal S10, outputs this first intermediate frequency signal S10 to the amplifier 35. The amplifier 35 amplifies the first intermediate frequency signal S10 to the predetermined power and outputs this to the mixer circuit 36. The mixer circuit 36, multiplying the first intermediate frequency signal S10 by the local signal S11 having the predetermined frequency supplied from the local oscillator 37, frequency converts the first frequency signal S10 to the second intermediate frequency signal S12 having such as 10.7 MHz and transmits this to the second IF filter 38.

Thus formed second intermediate frequency signal S12, after its unnecessary elements are eliminated by the second IF filter 38, is amplified to the predetermined power by the amplifier 39 and supplied to a demodulation circuit 40. The demodulation circuit 40, by applying the demodulation processing (e.g., QPSK demodulation processing) corresponding to the transmitting end to the second intermediate frequency signal S12, restores receiving burst data S13 from the second intermediate frequency signal S12 and outputs this to the time division multiplexing circuit 22.

The time division multiplexing circuit 22 takes out coded audio data S14 from the receiving burst data S13 and outputs this to the audio signal processing circuit 21. The audio signal processing circuit 21, applying the decoding processing corresponding to the ADPCM coding system to the coded audio data S14 to be entered, restores audio signal S15 from this coded audio data S14 and outputs this to a speaker 41.

The speaker 41 is comprised of electro-acoustic transform elements, and by applying the electro-acoustic transform processing to the input audio signal S15, converts the audio signal S15 to the sound wave and outputs it. Thus, the voice of the other party in talking can be heard via the speaker 41.

On the other hand, in the case of transmitting the data other than audio data (e.g., control data), inputting the data entered to the data input terminal 42 of the acoustic input/output unit 6 to the data processing circuit 43, applies the prescribed coding processing and inputs the resulting coded data S17 to the time division multiplexing circuit 22 of the receiver/transmitter unit 5. The time division multiplexing circuit 22 forms transmission burst data S3 by storing the coded data S17 in the transmission slot allocated to its own station in the same manner as the coded audio data S2 described above, and outputs this to the modulation circuit 23. Thus, the data other than the audio data can be transmitted as well.

Furthermore, in the case where the data other than the audio (e.g., music data according to music offering service) is received, the time division multiplexing circuit 22 takes out coded data S18 from the receiving burst data S13 in the same manner as in the case described above and outputs that coded data S18 to the data processing circuit 43. The data processing circuit 43, applying the predetermined decoding processing corresponding to the transmitting end to the coded data S18, restores the data received and outputs this via the data output terminal 44. With this arrangement, the data other than the audio can be also received and transmitted.

(1-4) Construction of Acoustic Input/Output Unit

Figure 5:
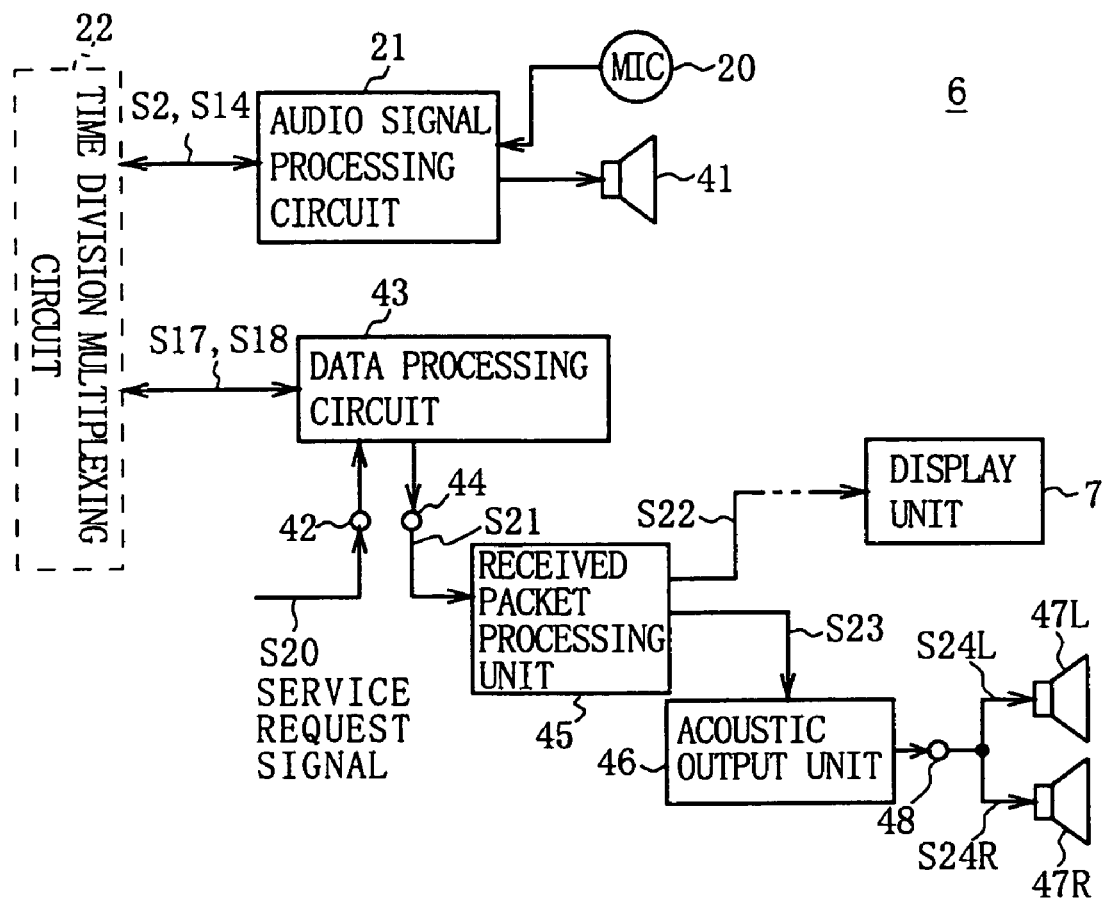
FIG. 5 is a block diagram showing the construction of the acoustic input/output unit of an acoustic receiver device.

In this chapter, the construction of the acoustic input/output unit 6 will be explained more specifically. As shown in FIG. 5, in the acoustic input/output unit 6, service request signal S20 sent out from the control unit 10 can be entered into the data processing circuit 43 via a data input terminal 42. As described above, this service request signal S20, after being coding processed, is transmitted to the PES base station 3 via the receiver/transmitter unit 5. Thus, the desire to receive the music offering service can be transmitted to the service center 2, that is the music sending source, via the PHS base station 3.

The music signal transmitted by the service center 2 in response to this service request signal S20 (this music signal contains add-on information added to the music signal) is received by the receiver/transmitter unit 5 and entered into the data processing circuit 43 as the coded data S18. The data processing circuit 43, by applying the predetermined decoding processing to this coded data S18, restores the receiving packet data S21 comprised of music data and outputs this to the received packet processing unit 45 via a data output terminal 44.

The received packet processing unit 45 separates the add-on information such as the title and words of the music from the receiving packet data S21 and outputs these to the display unit 7 via the data bus 11 described above as image or character data S22. Thus, in this acoustic receiver device 4, add-on information to be added to the music signal can be displayed on the display unit 7. Also, the received packet processing unit 45 separates the music data S23 from the received packet data S21 and outputs this to the acoustic output unit 46.

The acoustic output unit 46 takes out the stereophonic right side music signal S24R and the left side music signal S24L from the audio data S23 and outputs these to the right side electro-acoustic transform element 47R and the left side electro-acoustic transform element 47L of the earphone 13 connected to the output terminal 48 respectively. Thus, the user 12 can listen to the stereophonic music via the earphone 13. In this connection, as the earphone 13 connected to the output terminal 48, the high-fidelity earphone having high frequency characteristics is used and thus, the music of high sound quality can be heard and the appreciative values of music can be increased.

(1-5) Construction of PES Base Station

Figure 6:
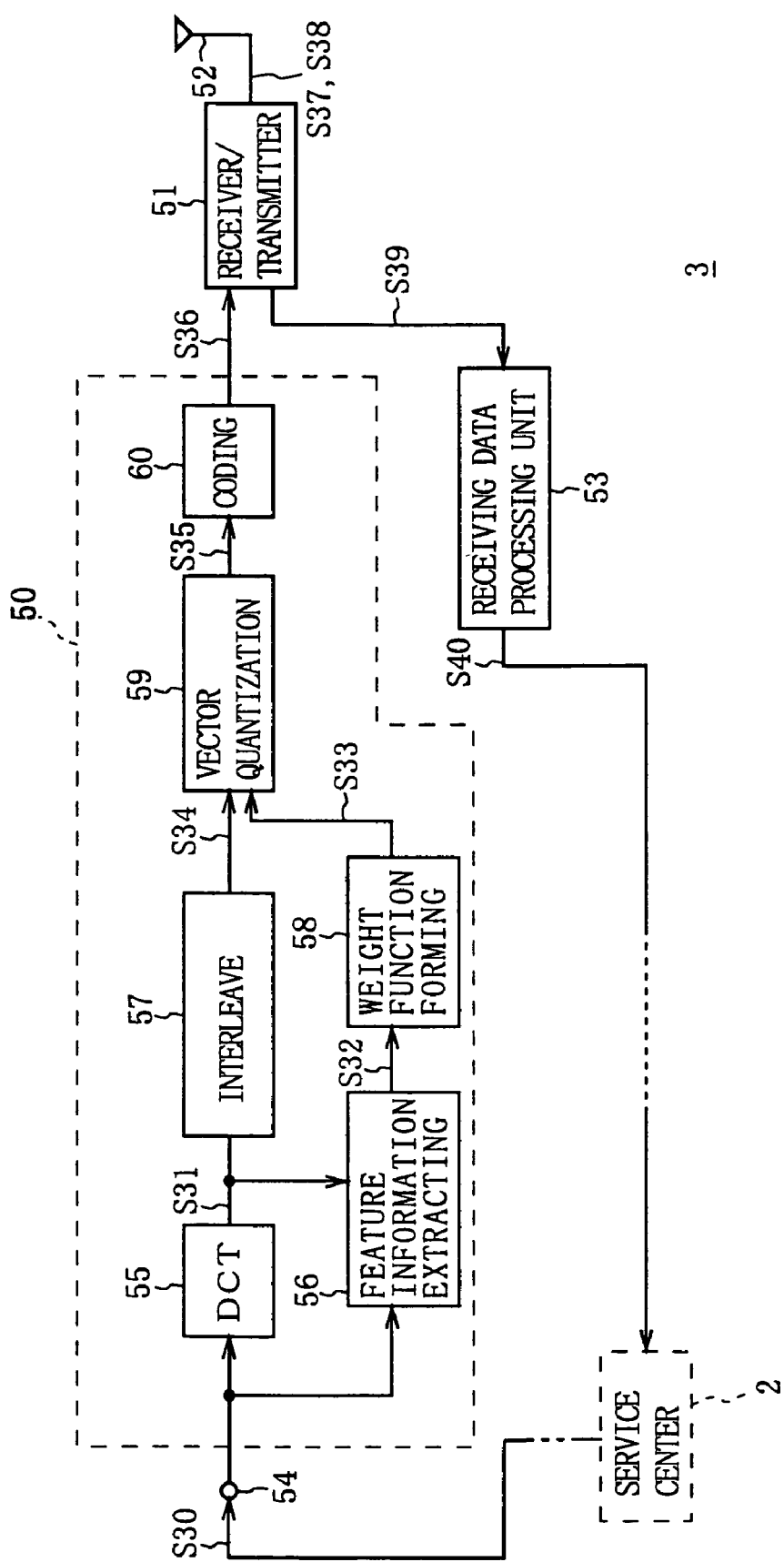
FIG. 6 is a block diagram showing the construction of the PES base station.

In this chapter, the construction of the PES base station 3 for transmitting the music signal will be described. However, only the circuit block for transmitting music signal will be explained in this chapter. As shown in FIG. 6, the PHS base station 3 comprises a transmission data processing unit 50, a receiver/transmitter unit 51, an antenna 52 and a received data processing unit 53. In this connection, it is not necessarily needed that the transmission data processing unit 50 and the receiving data processing unit 53 are loaded on the PUS base station, but in some cases they are loaded on the service center 2 which is the source of sending the music signal. And when they are loaded in the service center 2, the transmission data processing unit 50 and the received data processing unit 53 are connected to the PHS base station via the cable circuit.

The music signal transmitted from the service center 2, after being digitalized via the analog-to-digital conversion circuit (not shown in figure), entered into the transmission data processing unit 50 as a music data S30 through the data input terminal 54. In this connection, this music data S30 contains not only the music itself but also add-on information added to that music (such as the title and words of the music). In the transmission data processing unit 50, this music data is input into a discrete cosine transform circuit (DCT) and a feature information extracting circuit 56.

The discrete cosine transform circuit 55 is a circuit for coding the information source, and applying the discrete cosine transform to the input audio data S30, transmits the resulting transformed audio data S31 to an interleave circuit 57 and a feature information extracting circuit 56. In this connection, the discrete cosine transform is the processing in which the input data is shown by the multiplication of multiple base vectors having different frequency elements prepared in advance and coefficient (generally this is referred to as DCT coefficient) and the processing for outputting that coefficient as the transformed data and thus, this is the processing to decrease the volume of data of input data.

The feature information extracting circuit 56 extracts characteristics of the signal from both audio data S30 and transformed audio data S31 or either one of audio data S30 or transformed audio data S31, and outputs that feature information S32 to a weight function forming circuit 58. In this connection, feature means the characteristic of signal all its own, such as frequency element and signal wave pattern.

The weight function forming circuit 58 forms a weight function S33 based on the input feature information S32 and outputs this to a vector quantization circuit 59 to be described later. The weight function S33 is not the data itself to be transmitted but since it is the data showing the characteristic of that data, it is called as sub-information.

On the other hand, the interleave circuit 57 sorts the data order of the transformed audio data S31 to be entered in the predetermined order, and outputs the resulting transformed audio data S34 to the vector quantization circuit 59. Thus sorting the data order, when burst error occurs due to deterioration of the transmission path, error can be corrected by dispersing this, even in the case where the transmission path is deteriorated, data can be transmitted efficiently. Moreover, the transformed audio data S34 output from the interleave circuit 57 is the data itself to be transmitted, this is called as main information in contrast to the weight function S33 that is called as sub-information.

The vector quantization circuit 59 applies vector quantization to the input weight function S33 and transformed audio data S34 in utilizing the code book prepared inside in advance, and outputs the resulting quantization data S35 to a coding circuit 60. In this connection, the vector quantization detects the optimal typical vector representing the input data from among the typical vectors prepared as the code book and quantizes codes showing that typical vector, and can decrease the data volume of input data tremendously.

The coding circuit 60 applies the coding processing for error correction to the input quantization data S35 and outputs the resultant transmission data S36 to the receiver/transmitter unit 51. In the vector quantization circuit 59, since in the case of quantizing the transformed audio data S34, the quantization processing is conducted in utilizing the feature information shown by the weight function S33, the weight function S33 plays very important role in quantizing the transformed audio data S34 efficiently. Accordingly, the weight function S33 must show certainly the feature of the input data and also the weight function S33 must be transmitted without fail. Accordingly, in the coding circuit 60, stronger error correcting processing is applied to the data part of the weight function S33 (sub-information) than the data part of the transformed audio data S34 (main information). The receiver/transmitter unit 51 has the construction similar to that of the receiver/transmitter unit 5 of the acoustic receiver device 4, and after applying the predetermined transform processing such as by the QPSK transform to the transmission data S36 entered, applies the frequency conversion processing and forms transmission signal S37 and transmits this via an antenna 52. With this arrangement, music signal transmitted from the service center 2 is transmitted via the PES wireless circuit.

On the other hand, the transmission signal S6 on which the service request signal S20 transmitted from the acoustic receiver device 4 is piled is received by the antenna 52 and entered into the receiver/transmitter unit 51 as a received signal S38. The receiver/transmitter unit 51, after taking out the intermediate signal by applying the frequency conversion to the received signal S38, applies the demodulation processing to that intermediate frequency signal and restores the received data S39 and outputs this to the received data processing unit 53.

The receiving data processing unit 53 restores the service request signal S20 by applying the predetermined decoding processing to the received data S39, and outputs this to the service center 2 as a control signal S40. Thus, the service center 2 can be notified that the acoustic receiver device 4 is requesting the music offering service. The decoding processing to be conducted in the receiving data processing unit 53 is the decoding processing with respect to the coding processing conducted in the data processing circuit 43 of the acoustic receiver device 4.

(1-6) Construction of Data Processing Circuit of Acoustic Receiver Device

Figure 7:
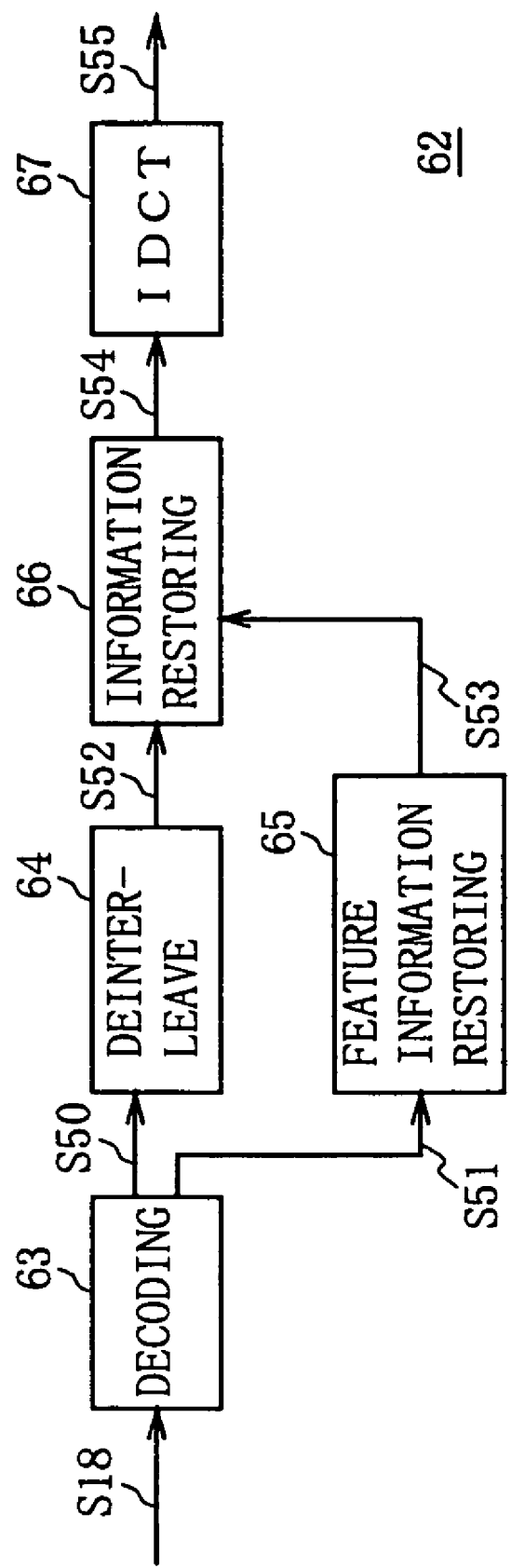
FIG. 7 is a block diagram showing the construction of the data decoding block of a data processing circuit.

In this chapter the data processing circuit 43 of the acoustic receiver device 4 described above will be described. The data processing circuit 43 described above comprises a data decoding block 62 as shown in FIG. 7, and the music data transmitted from the PHS base station is decoding processed by this data decoding block 62.

In this data decoding block 62, firstly the coded data S18 transmitted from the time division multiplexing circuit 22 of the receiver/transmitter unit 5 is entered into the decoding circuit 63. This decoding circuit 63, after applying the error correction processing to the input coded data S18, corrects errors contained in the data, separates the main information data S50 and the sub-information data S61 and outputs the extracted main information data S50 and sub-information data 51 to a deinterleave circuit 64 and a feature information restoring circuit 65 respectively.

The deinterleave circuit 64 returns the data order sorted at the interleave circuit 57 of the transmitting end to the former order and outputs the resulting main information data S52 to an information restoring circuit 66. On the other hand, the feature information restoring circuit 65 restores feature information S53 from the input sub-information data S51 and outputs this to the information restoring circuit 66.

The information restoring circuit 66, conducting the decoding processing of the main information data S52 using the input feature information S53, restores the decoding data S54 corresponding to the transformed data S31 (i.e., DCT transformed data) from the main information data S52 and outputs this to a discrete cosine inverse transform circuit (IDCT) 67. The discrete cosine inverse transform circuit 67 is a circuit for decoding the information source, and restores the music data S21 corresponding to the music data S30 at the transmitting end by applying the discrete cosine inverse transform processing to the input decoding data S54 and outputs this to the receiving packet processing unit 45 as described above.

Accordingly, in the acoustic offering service system 1, since the discrete cosine transform processing and the vector quantization processing are applied to the music data S30 at the transmitting end, and at the receiving end, by conducting the reversed processing, the transmitted music data S21 is restored and the transmitted music data S21 can be efficiently and certainly restored even in the case where the circuit condition changes. Also, the discrete cosine transform processing and the vector quantization processing are applied to the music data S30 when transmitting, the volume of data to be transmitted can be decreased and the data can be transmitted efficiently.

(1-7) Operation and Display when Receiving Music Offering Service

Figures 8, 9:
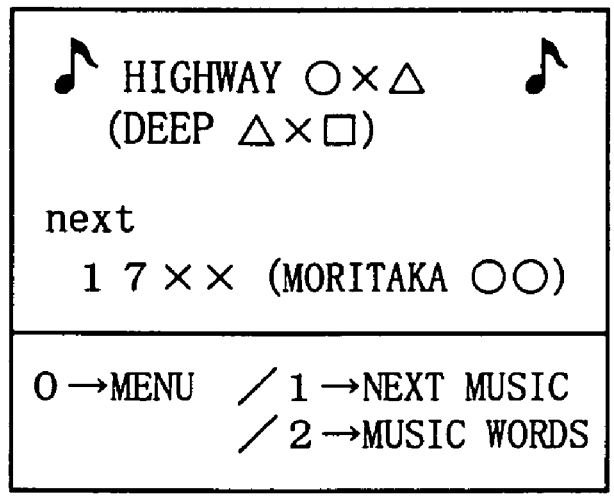
FIG. 8 is a schematic diagram showing a menu screen for the music offering service.
FIG. 9 is a schematic diagram showing a music names display screen when receiving the music offering service.

Then next, in this chapter the operation in the case of receiving the music offering service in utilizing the acoustic receiver device 4 and display examples of the display unit 7 at that time will be explained. At first, when the predetermined operation is conducted by using the operation unit 9 of the acoustic receiver device 4, as shown in FIG. 8, a menu screen of music offering service is displayed on the display unit 7. The data of this menu screen are memorized in the memory unit 8 in advance, and by reading out that data and supplying to the display unit 7, the menu screen as shown in FIG. 8 is displayed.

A total of ten modes is prepared on this menu screen, and item names and item numbers showing these modes are displayed respectively. The modes from the first to the third, i.e., "the latest best-ten (J-POP)", "the latest best-ten (rock)", and "the latest best-ten (Enka)" are the modes with which the user can hear 10 tunes determined as the latest hit musics in each genre in the order from the lowest rank or the top rank.

Furthermore, the modes from the fourth to the sixth, i.e., "random pickup (1990s)", "random pickup (19808)" and "random pickup (1960s –1970s)" are modes with which the user can hear the music selected randomly from musics in each era. Moreover, the modes from the seventh to the ninth, i.e., "jazz random", "classic random" and "reggae random" are modes with which the user can hear the music randomly selected from musics of each genre.

In this connection, in the 4th to 6th and 7th to 9th modes, the user does not select the music but the service center 2 selects the music. More specifically, the service center 2 selects an optional music from the music group classified per each field using such as random numbers and offers that music. In that case, the service center 2 memorizes the musics that the user heard in the past fixed time period (such as from the morning of that day to the present, or from the morning of the day before to the present) and selects an optional music from the music group excluding these musics. Thus, the same music that the user heard once can be prevented from being selected immediately and with the lapse of time that music can be selected again. The reason of this arrangement is to offer the service matching to the psychology of the user, i.e., he does not want to hear the same music continuously.

Lastly, the tenth mode, i.e., "program mode" is the mode with which the user can hear the selected music by informing the selected music to the service center 2. In the case of this mode, the user can specify and hear only one music or he can specify and hear the plural number of musics in order.

Accordingly, when starting the music offering service by specifying the desired mode from these menu screens, the user enters the desired mode item number using the numeric key of the operation unit 9. With this operation, a service request signal S20 corresponding to the desired mode is transmitted to the service center 2. Thus, the service center 2 can grasp the user desired mode and can start the music offering service of the user desired mode. In the case of "program mode", since the selection of music becomes necessary, the service request signal S20 would not be transmitted only by entering the item number but when the music selection processing to be described later is completed, the service request signal S20 is transmitted.

Furthermore, as described above, since the music service mode can be roughly divided into the mode to transmit musics determined at the service center side in due order (the first to the third mode), the mode to transmit the music upon selecting randomly from the music group prepared in the service center side (the fourth to the ninth mode) and the mode that the service center transmits the music specified by the user side (the tenth mode), the service request signal S20 can be roughly classified under 3 types.

At this point, when the music offering service is actually started, the display screen as shown in FIG. 9 is shown on the display unit 7 of the acoustic receiver device 4. More specifically, as shown in FIG. 9, the music title display screen is displayed as the normal mode. In this case, "Highway ○X∆" displayed on the upper part of the display unit 7 shows the title of the music presently running and "Deep ∆X□∆" displayed under this shows the name of singer or the name of composer of that music. In this connection, if the musical composition is the classic music, the name of composer is displayed with the name of singer.

This is because the user has stronger desire for finding the name of composer in addition for finding the name of player.

Moreover, the musical note "♪" displayed before and after the title of a music is a mark showing that the screen presently displayed is the music title display screen. Since such musical code is to be displayed, the user can easily find that the screen presently displayed is the music title display screen.

"17 xx" displayed on the lower part of "next" in the center of the display unit 7 shows the title of a music to be played next, and its adjacent "Moritaka ○○" shows the name of singer or the name of player of the next music. This music title display can be cancelled by setting the display cancellation. Since in the case of random mode (the first mode to the ninth mode) what is going to be played next is not known is one of pleasures, this processing is conducted in order to realize the operating pattern reflecting such user psychology.

Furthermore, the sub-menu is displayed on the lowest stage of the display unit 7. "0→menu" displayed in this sub-menu shows that when "0" is entered from the numeric key, the display is switched to the menu screen for mode setting shown in FIG. 8. Moreover, "1→next music" shows that when "1" is entered from the numeric key, the music presently being played is stopped and the next music will be started. Moreover, "2→words" shows that when "2" is entered from the numeric key, the music name display screen is switched to the music word display screen to be explained in the following.

In this connection, the title of music and the name of singer to be displayed on this music name display screen, or the data of music title and singer's name are extracted from the add-on information transmitted with the music data from the service center 2. Moreover, as shown in the sub-menu, when "1" is entered, the service request signal S20 to request the starting of the next music performance is transmitted. Thus, the service center 2 stops the output of the music data presently running and starts the output of the next music data. This is not shown in the sub-menu, but if the call complete key is pressed in the middle of receiving the music offering service, the PHS wireless circuit is cut off and the music offering service automatically stops.

Figure 10:
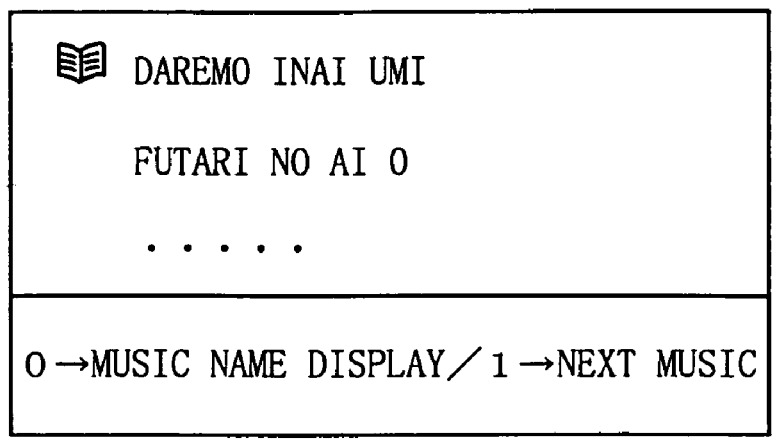
FIG. 10 is a schematic diagram showing a music words display screen when receiving the music offering service.

At this point, as shown in the sub-menu, when "2" is entered from the numeric key, the words display screen shown in FIG. 10 is displayed on the display unit 7. In this case, a book mark shown on the upper part of the screen shows that the screen presently displayed is the words display screen. Since such book mark is to be displayed, the user can easily know that the screen presently displayed is the words display screen.

Furthermore, words of the music presently running is displayed on the adjacent or lower part of this book mark. The display form of this music word display (such as color, hatching or flashing) is changed according to the music in progress, and thus, the user can easily know to what extent the music has been progressed so far.

Furthermore, the sub-menu is displayed on the lower part of this word display similar to that of the music title display screen. "0→music title display" in the sub-menu shows that when "0" is entered from the numeric key, returns to the music title display screen shown in FIG. 9. And "1→next music" shows that when "1" is entered from the numeric key, the music presenting running is stopped and the next music will be started.

Figure 11A:
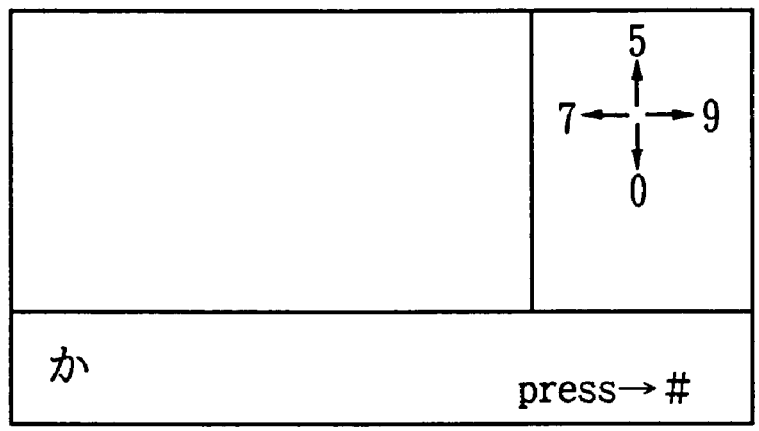
FIGS. 11A and 11B are schematic diagrams showing a display screen and a virtual character table of the program mode.

On the other hand, on the menu screen shown in FIG. 8, if the item number "0" showing "program mode" is entered, the program mode screen as shown in FIG. 11A is displayed on the display unit 7. Arrow marks and numbers displayed on the right side of this screen show that when "5" is entered from the numeric key, a virtual cursor moves upward on the virtual character table, and similarly, if "0" is entered, the virtual cursor moves downward, if "7" is entered, the virtual cursor moves toward the left direction and if "9" is entered, the virtual cursor moves toward the right direction.

Figure 11B:
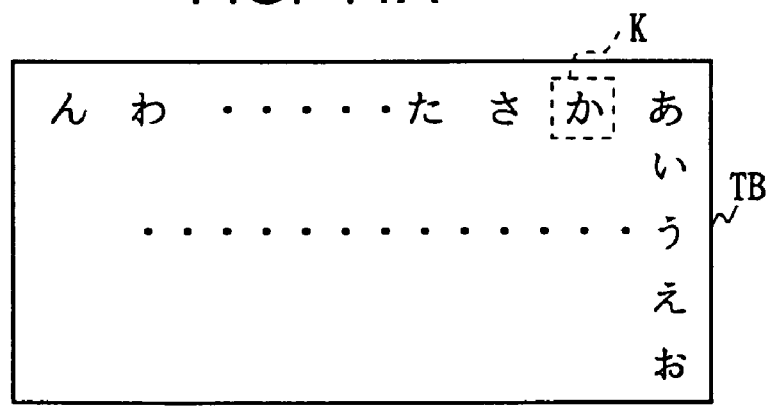

More specifically, as shown in FIG. 11B, the virtual character table TB is constructed by a fifty phonetic words table on which virtual characters of fifty phonetic words are arranged two-dimensionally according to "あいうえお(a i u e o)" (Japanese alphabetical order) and when "5" is entered, the virtual cursor K moved from the "お(o)" stage toward the "あ(a)" stage, while "0" is entered, the virtual cursor K moves from the "あ(a)" stage toward the "お(o)" stage, and when "7" is entered, the virtual cursor K moves from the "あ(a)" line toward the "ん(n)" line, and when "9" is entered, the virtual cursor R moves from the "ん(n)" line toward the "あ(a)" line.

In that case, the Kana character on which the virtual cursor K is positioned is displayed on the lower part of the display screen. For example, if the virtual cursor K is positioned on the Kana character "か(ka)", the Kana character "か(ka)" is selected, and as shown in FIG. 11A, the Kana character "か(ka)" is displayed on the lower part of the display screen. Accordingly, if the numeric key of "5", "10", "7" or "9" is operated, the desired Kana character can be displayed in the acoustic receiver device 4.

Furthermore, on the display screen under this program mode, "press→#" is displayed on the lower part of the screen. This display means that if "#" is entered from the numeric key, the determined instruction is entered and the Kana character presently being displayed can be confirmed and entered.

On the display screen of this program mode, in the case of specifying the user desired music, firstly, the user enters the first letter of the title name of the desired music by operating the numeric key. For example, as shown in FIGS. 11A and 11B, if the user desires the music having the title name starting with "か(ka)", enters Kana letter "か(ka)". If the initial letter can be entered, then entering "#", that Kana letter is confirmed and the service request signal S20 to request the music name list in which the music title names having the initial letter "か(ka)" are transmitted from the acoustic receiver device 4. Thus, the service center 2 transmits the music name list on which the music title names having "か(ka)" as the first letter are listed to the acoustic receiver device 4 responding to the service request signal S20.

Figures 12, 13:
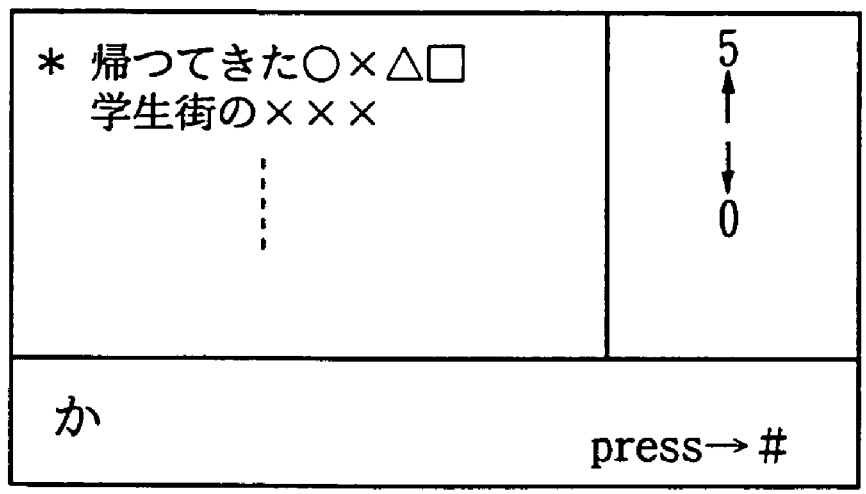
FIG. 12 is a schematic diagram showing a display screen when the music list is displayed in the program mode.
FIG. 13 is a schematic diagram showing the music name of the music specified in the program mode.

When this music name list is received, the music name list as shown in FIG. 12 is displayed on the display unit 7. As shown in this FIG. 12, when the music name list is received, each music name received as the music name list is displayed vertically in due order. In this case, only arrow marks and "5" and "0" are displayed on the right side screen that is different from the case described a little while ago. This means that the cursor "*" to be displayed in front of the title name can be moved upward and downward using the "5" or "0" numeric key. When the cursor "*" is moved to the bottom of the screen with the "0" key, and if the music name list still continues downward, the music name list is shifted upward and scroll displayed. And contrary to this, when the cursor "*" moves to the uppermost of the screen using the "5" key, if the music name list still continues upward, the music name list is shifted downward and scroll displayed, and thus, even in the case where the number of music names listed is too large to be displayed on the display screen, all lists can be displayed. Under this condition, since the music name lists received are only displayed, the cursor "*" is in a flashing state showing that the music specification has not been conducted.

At this point, in the case where the user specifies the desired music, the user displays the cursor "*" on the title name of the music that he wants to hear by operating the numeric key "5", or "0". Then, entering the "*" by pressing the "*" key, the music on which the cursor "*" is positioned is confirmed. With this arrangement, the cursor "*" is changed from the flashing display to the continuous display showing that the music has been determined. Further, the determination of the music can be expressed by not only displaying "*" key but also changing the display form of the music title itself by means of reversion, etc.

When the music is determined, the service request signal S20 showing that the music has been confirmed to the service center 2 via the PES wireless circuit. The service center 2 can grasp the user desired music by this service request signal S20 and transmits the music code to define that music to the acoustic receiver device 4 through the PHS wireless circuit. In this connection, this music code is a code added to all musics kept by the service center 2 in advance in order that these codes vary from music to music.

In the case of program mode, by repeating such operations, the user desired musics are specified one by one, and the music codes specifying that musics are obtained one by one. Then, these music codes obtained are memorized in the memory unit 8 as one file as shown in FIG. 13. In this case, "Fav1" on the first line is a file name and this is specified by the user optionally, or automatically added so that this is different from the file name formed previously in the acoustic receiving device 4. Moreover, "Title_of_1=Highway ○X Δ" on the second line shows that the title of the music specified as the first music is "Highway ○X Δ", and "Code_of_1=225920" on the third line shows the music code of the first music is "225920". Thus pairing the music name with the music code, these are memorized according to the order of musical performances specified. Thus, referring to the music name file, the music name and music code specified by the user can be grasped, and simultaneously, the performance order can be grasped.

The music name list thus formed by obtaining the music codes is displayed actually on the display unit 7 when the predetermined operation is conducted from the operation unit 9, and thus, the user can confirm visually whether the music specified is fit or not by himself.

Thus, in the case of receiving the music service of the program mode, after forming the music name file, the fixed operation is conducted and music codes are successively read out according to the order of that music name file and the service request signal S20 to which that music code is added is transmitted. Thus, the music signal specified by the user can be transmitted from the service center 2 and the music offering service of the program mode can be started.

(1-8) Control Procedure of Control Unit Regarding Music Offering Service

The control procedure of the music offering service described above is conducted by the operation control of the control unit 10, however, in this chapter the control procedure will be explained using flow charts in due order.

Figure 14:
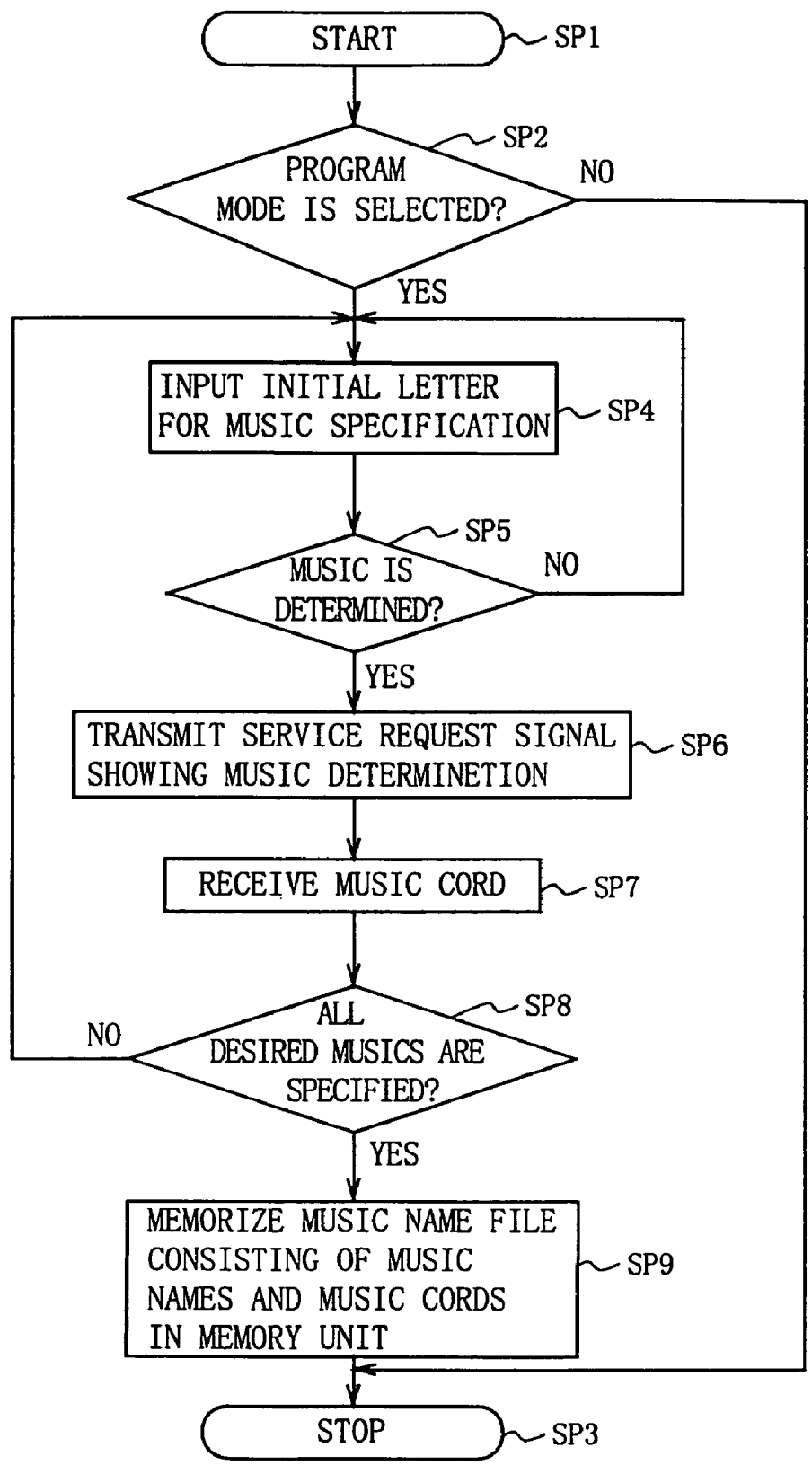
FIG. 14 is a flow chart showing the procedure in the case of specifying music in the program mode.

Firstly, in the case of specifying the music, the music is specified according to the operating procedure shown in FIG. 14. More specifically, at the step SP2 entered from the step SP1, the control unit 10 judges whether the operation to select the program mode has been conducted or not while the menu screen is displayed. As a result, if the operation other than the program mode is conducted, the control unit 10, after transmitting the service request signal S20 showing that mode, proceeds to the step SP3 and terminates the processing.

On the other hand, when the program mode is specified, the control unit 10 proceeds to the step SP4 and accepts the first letter input for the music specification. At the step SP4, if the first letter input for the music specification is conducted, the control unit 10, by requesting the music name list consisting of letters having the first letter of each title name, obtains the music name list from the service center 2 and displays that music name list on the display unit 7.

Then, at the step SP5, the control unit 10 judges whether the confirmation operation is conducted to the optional music in that music name list or not, and if the music confirmation operation is conducted, proceeds to the step SP6 and transmits the service request signal S20 showing the music conformation and at the following step SP7, receives the music codes transmitted from the service center 2. On the other hand, if the music confirmation operation has not been conducted, the control unit 10 returns to the step SP4 and accepts again the first letter input of the music specification.

When the control unit 10 obtains music codes, proceeds to the step SP8, and judges whether the user desired musics have been all specified or not by judging whether the operation of music specification would be continuously conducted or not. As a result, if the operation of music specification is continuously conducted, the control unit 10 returns to the step SP4 and repeats the processing and when the music specification is finished, it proceeds to the step SP9.

At the step SP9, the control unit 10 stores all music names and music codes specified by the processings described above in the order specified in the music name file and memorizes the music name file in the memory unit 8. When this processing is done, the control unit 10 proceeds to the step SP3 and terminates the processing for music specification.

Figure 15:
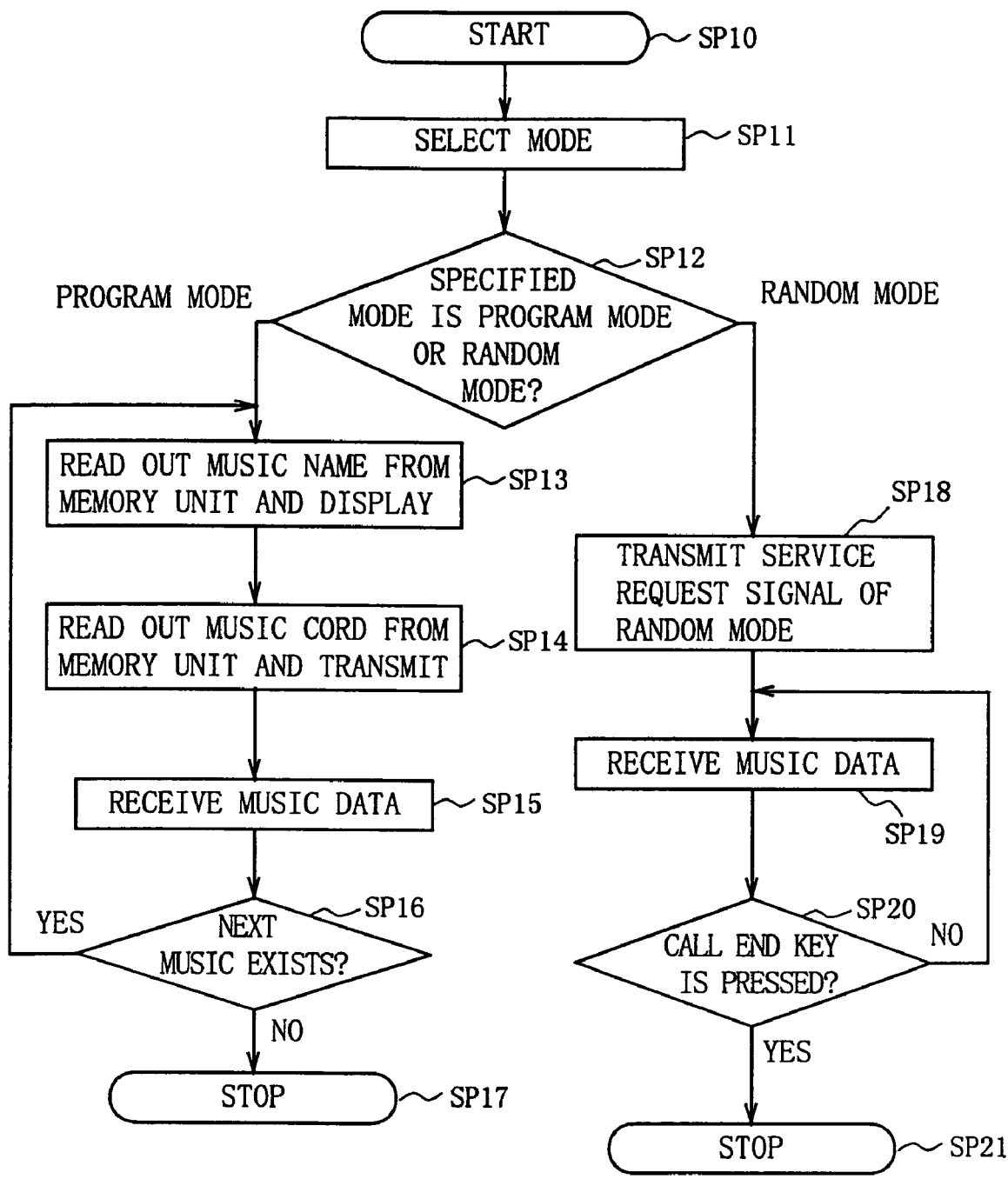
FIG. 15 is a flow chart showing the procedure in the case of receiving the music offering service.

On the other hand, as the procedure in the case of receiving the music offering service becomes as shown in FIG. 15. More specifically, at the step SP11 entered from the step SP10, the control unit 10 accepts the numeric key input for selecting the mode during the menu screen is displayed. Then, at the following step SP2, the control unit 10 judges whether the program mode is specified or the random mode is specified by determining the type of the input numeric key. As a result, if the program mode is specified, the control unit 10 proceeds to the step SP13 and if the random mode is specified, proceeds to the step SP18.

At the step SP13, the control unit 10 reads out the title of music from the music name file stored in the memory unit 8 by the music specification and displays this on the display unit 7. Then, at the step SP14, the control unit 10 reads out the music code of the music displayed from the music name file and transmits this to the service center 2. At the following step SP15, the control unit 10 receives the music data transmitted from the service center 2 responding to that music code transmitted and outputs this via the earphone 13. Thus, the user can hear the music specified through the earphone 13.

When the music data for a piece of music has been received, the control unit 10 proceeds to the following step SP16 and judges whether the next music exists in the music name file or not, and if the next music exists, returning to the step SP13, repeats the processing, and if the next music does not exist, proceeding to the step SP17, terminates the processing.

On the other hand, in the case where the control unit 10 has been proceeded to the step SP18 because the random mode was specified, the control unit 10 transmits the service request signal S20 corresponding to the random mode specified (the random mode in this case are first to ninth modes shown in FIG. 8) to the service center 2. At the following step SP19, the control unit 10 receives the music data transmitted from the service center responding to that service request signal S20 and outputs this via the earphone 13. Thus, the user can hear the music corresponding to the user specified music offering mode through the earphone 13.

At the next step SP20, the control unit 10 judges whether the music offering service stop has been specified or not by judging whether the telephone call stop key is pressed or not. As a result, if the music offering service stop has not been specified, returning to the step SP19, the control unit 10 repeats the processing, and if the stoppage is specified, the control unit 10, proceeding to the step SP21, stops to receive the music offering service and terminates the processing. In addition, the telephone call stop key is pressed so as to stop to receive the service in the program mode similarly, which is not shown in FIG. 15.

(1-9) Operation Unit Provided in the Main Unit of Acoustic Receiver Device

Figure 16:
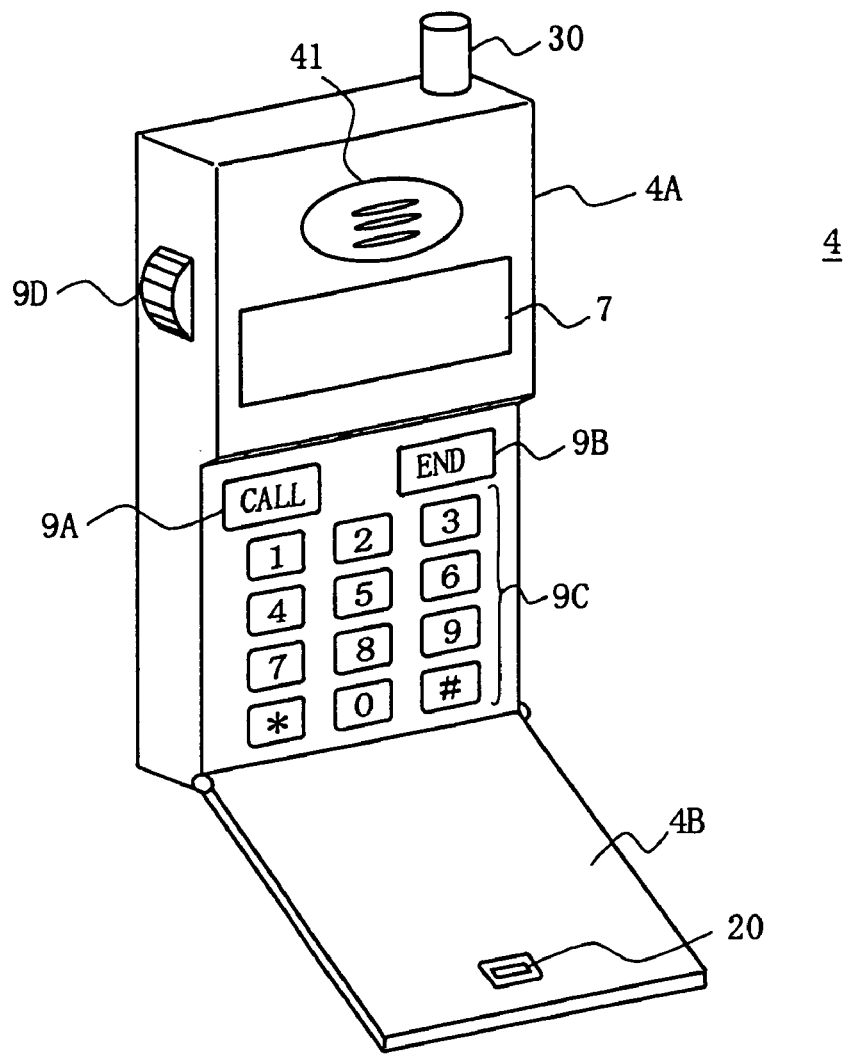
FIG. 16 is a perspective view of the external construction of an acoustic receiver device.

Lastly in this chapter, the operation unit 9 provided in the main unit of the acoustic receiver device 4 will be described with referring to FIG. 16. The PHS base station 3 and an antenna 30 for wireless communicating are loaded on the top of the main unit case 4A in which each electric circuit of the acoustic receiver device 4 is stored. Also in front of the main unit case 4A the display unit 7 and a in front of the main unit case 4A the display unit 7 and a speaker 41 of the acoustic input/output unit 6 are provided. Furthermore, a telephone call key 9A, a telephone call end key 9B and numeric key 9C are provided on the lower part of the display unit 7. In this connection, the numeric key 9C is comprised of ten numeric keys "0" to "9", and two special keys, "*" key and "#" key.

Furthermore, a flipper 4B is attached to the main unit case 4A rotation free on the lower part of the main unit case 4A. This flipper 4B is so arranged that this flipper just covers over the telephone call key 9A, the telephone call end key 9B and the numeric key 9C. And thus, erroneous pressing of operation keys can be prevented when the acoustic receiver device 4 is putting in the bag or pocket. Moreover, a microphone 20 of the acoustic input/output unit 6 is provided on the front-end of this flipper 4B, and by opening this flipper 4B, the microphone 20 exactly reaches to the user's mouth when the user is making a call and the user's voice can be picked up easily.

Figure 17:
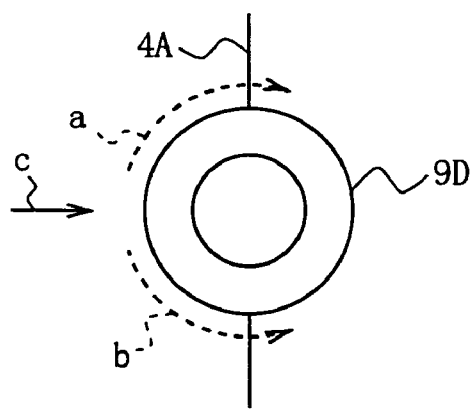
FIG. 17 is a schematic diagram explaining the operation of a rotary push type operation key.

Furthermore, a rotary-press type operator forming the operation unit 9, i.e., a jog dial 9D is provided on the side of the main unit case 4A. As shown in FIG. 17, this jog dial 9D is attached to the main unit 4A so that it is rotatable in the direction shown by an arrow "a" or "b". When rotating this jog dial 9D, the user can hear and feel it click and thus, the user can easily know that the dial is rotated in which direction and how much.

When this jog dial 9D is rotation operated, the jog dial 9D generates pulse corresponding to that rotation angle (since this pulse corresponds to the rotation angle, this shows the direction of rotation and the rotation rate). By detecting the pulse generated by this jog dial, the control unit 10 can detect in which direction and how much the jog dial 9D is rotation operated. And the control unit 10 moves the cursor displayed on the display unit 7 upward and downward for the amount corresponding to the rotation direction and the rotation rate detected. Thus, in this acoustic receiver device 4, the cursor can be easily moved not pushing the key "5" or "0" as described above.

Furthermore, the jog dial can be push operated in the direction shown by an arrow "c" (i.e., almost vertically with respect to the main unit 4A). And when the jog dial 9D is push operated, generates a switch signal showing that the push operation is conducted. The control unit 10, by detecting this switch signal, can detect the push operation of the jog dial 9D, and when the control unit 10 detects the push operation, confirms the item on which the cursor is displayed. Thus, in the acoustic receiver device 4, the item on which the cursor is placed can be confirmed without pressing the "#" key. And accordingly, by providing such jog dial 9D, although the number of parts is increased, the operability and marketability of the acoustic receiver device 4 can be improved.

In this connection, the remote operator 14 placed on the cable of the earphone 13 is also equipped with a display unit 7, telephone call key 9A, telephone call end key 9B, the numeric key 9C and the jog dial 9D, and the same operation as that of the above can be conducted if the remote operator 14 is used.

(1-10) Operation and Effects

According to the foregoing construction, in the case of receiving the music offering service by the music offering service system 1, firstly, the service request signal S20 is transmitted from the acoustic receiver device 4 to the service center 2 via the PHS wireless circuit. In this case, the music service to be offered can be roughly divided into the random mode, i.e., the service center 2 side determines music, and the program mode, i.e., the user determines music. When the user desires the random mode, the service request signal S20 showing the user's intention is transmitted to the service center 2. The service center 2 selects the music from the music group and transmits that music data responding to the service request signal S20, or selecting the music in due order from the music group registered as the latest best ten, transmits that music data. Thus, the acoustic receiver device 4 receives the music data transmitted via the PHS wireless circuit and outputs this to the earphone 13. Accordingly, the user can hear the desired music via the earphone 13.

On the other hand, if the user desires the program mode, firstly, by entering the first letter of the music he desires, requests the music name list to the service center 2. The service center 2 transmits the music name list consisting of title names having the specified letter as the first letter. The acoustic receiver unit 4 displays that music name list on the display unit 7 and makes the user to select the music he desires from it. And when the user determines the music he wants, transmits the service request signal S20 showing the music determination and receives the music codes from the service center 2. By repeating this operation thereafter, the music name file consisting of the user desired music title names and music codes is formed. Then, the acoustic receiver device 4, by reading out the music codes from the music name file in due order and transmitting to the service center 2, makes the user-desired music data to be transmitted to the service center 2. Hence, receiving the music data and by outputting this from the earphone 12, the user can hear the user-desired music.

Accordingly, since in this music offering service system 1, the user-desired music data is transmitted via the PHS wireless circuit and received at the acoustic receiver device 1 and transmitted, the user can hear the music he wants on the move without having the recording medium such as a cassette tape and compact disc., that is so-called music-on-demand service can be realized in the mobile communications and can offer great convenience to the user.

Furthermore, the music offering service system 1, in the case of transmitting the music data, applying the discrete cosine transform processing and the vector quantization processing to the music data, transmits this. Thus, if it transmits the music data upon applying the discrete cosine transform processing and the vector quantization processing, the music data can be received correctly at the receiving end even when the circuit condition changes. Accordingly, it becomes unnecessary to switch the frequency characteristic according to the circuit condition, or to switch the signal output system from stereo to mono and the music offering service can be offered securely.

According to the foregoing construction, since the user-desired music data is applied the predetermined modulation/coding processing and transmitted, and the receiving end receives that music data and after applying the predetermined demodulation/decoding processing, outputs the music data via the predetermined output means, the user can hear the desired music on the move without having the recording medium, and the music offering service having further improved convenience can be realized.

(2) The Second Embodiment

The first embodiment described above has dealt with the case of receiving the music offering service by the user carrying the acoustic receiver device 4. However, in this second embodiment, the case of receiving the music offering service by combining the acoustic receiver device and the vehicle loaded acoustic equipment will be explained.

Figure 18:
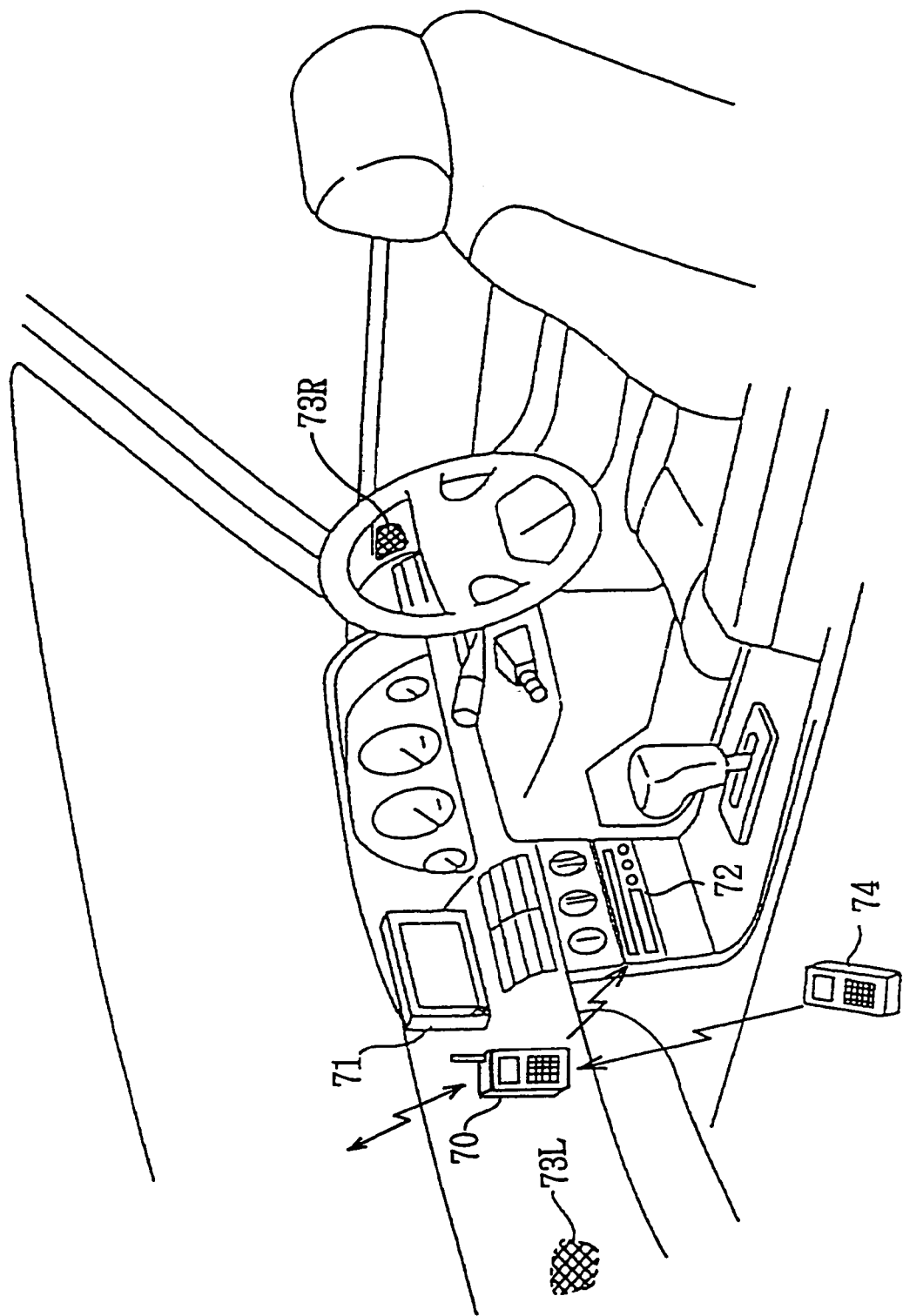
FIG. 18 is a schematic diagram showing the system construction of the receiving end according to the second embodiment.

In FIG. 18, 70 generally shows an acoustic receiver device according to the second embodiment, and also in the case of this embodiment, music data transmitted from the PES base station 3 is received at the acoustic receiver device 70. However, this acoustic receiver device 70 does not transmit the music data received from the earphone 13 as the first embodiment but it transmits the music data via the vehicle loaded acoustic equipment provided in the car.

As the recent vehicle loaded acoustic equipment, the equipment in which such as the navigation device and the television receiver set are combined, not the equipment for just receiving the radio broadcast as before has been proposed. As shown in FIG. 18, such vehicle loaded acoustic equipment roughly comprises a display unit 71 for displaying the map and route for navigation, or images of the television broadcasting received and various menus; an acoustic equipment main unit 72 in which a navigation device consisting of the present position locating means and the map database means and a receiver unit of the television receiver, or a music reproduction unit for reproducing the music from the recording medium such as the mini disc and compact disc, and a radio receiver of the AM/FM radio broadcast; and stereo-capable speakers 73R and 73L for outputting sounds of the radio broadcast received and the reproduced music.

The acoustic receiver device 70 according to the second embodiment applies FM modulation (frequency modulation) to the music data received via the PHS wireless circuit and transmits this in the weak electro-magnetic wave (hereinafter referred to as radio wave) of the FM broadcasting frequency band (normally 76 MHz to 90 MHz). The radio receiver of the vehicle loaded acoustic equipment receives the FM signal transmitted in the weak radio wave, and restoring the music data from the FM signal received, outputs this via speakers 73R and 73L. Thus, the user can hear the music that he wants to listen in stereo sounds via the speakers 73R, 73L of the vehicle-loaded acoustic equipment already loaded in the automobile.

Thus, the acoustic receiver device 70 according to the second embodiment transmits the music data received via the PHS wireless circuit after retransforming the music signal to the FM signal of the weak radio wave, and this is received by the radio receiver of the vehicle loaded acoustic equipment and music is transmitted. Thus, in utilizing the existing vehicle loaded acoustic equipment, the high quality music can be transmitted with high power output.

In this connection, according to the second embodiment, the control data transmitted in the infrared ray can be received at the acoustic receiver device 70, and thus, the operation of the acoustic receiver device 70 and the vehicle loaded acoustic equipment can be controlled by using the remote controller 74.

Furthermore, according to the second embodiment, when displaying images of the television broadcasting received, the image of the television broadcasting and the information regarding the music data to be received such as the music name and the menu screen when receiving the music offering service described in the first embodiment can be displayed simultaneously or upon being switched on the display unit 71. Similarly, when displaying the route screen for navigation, the route screen and the information concerning the music data to be received can be displayed on the display unit 71 simultaneously or after being switched. Thus, in this second embodiment, the display unit 71 already provided as a vehicle loaded acoustic equipment can be used in the music offering service.

Moreover, in the acoustic receiver device 70 according to the second embodiment, various electric circuits of the receiver/transmitter unit can be driven by the battery as in the case of the first embodiment and if it is detached from the dashboard, it can be used as a normal PES communication terminal device.

Figure 19:
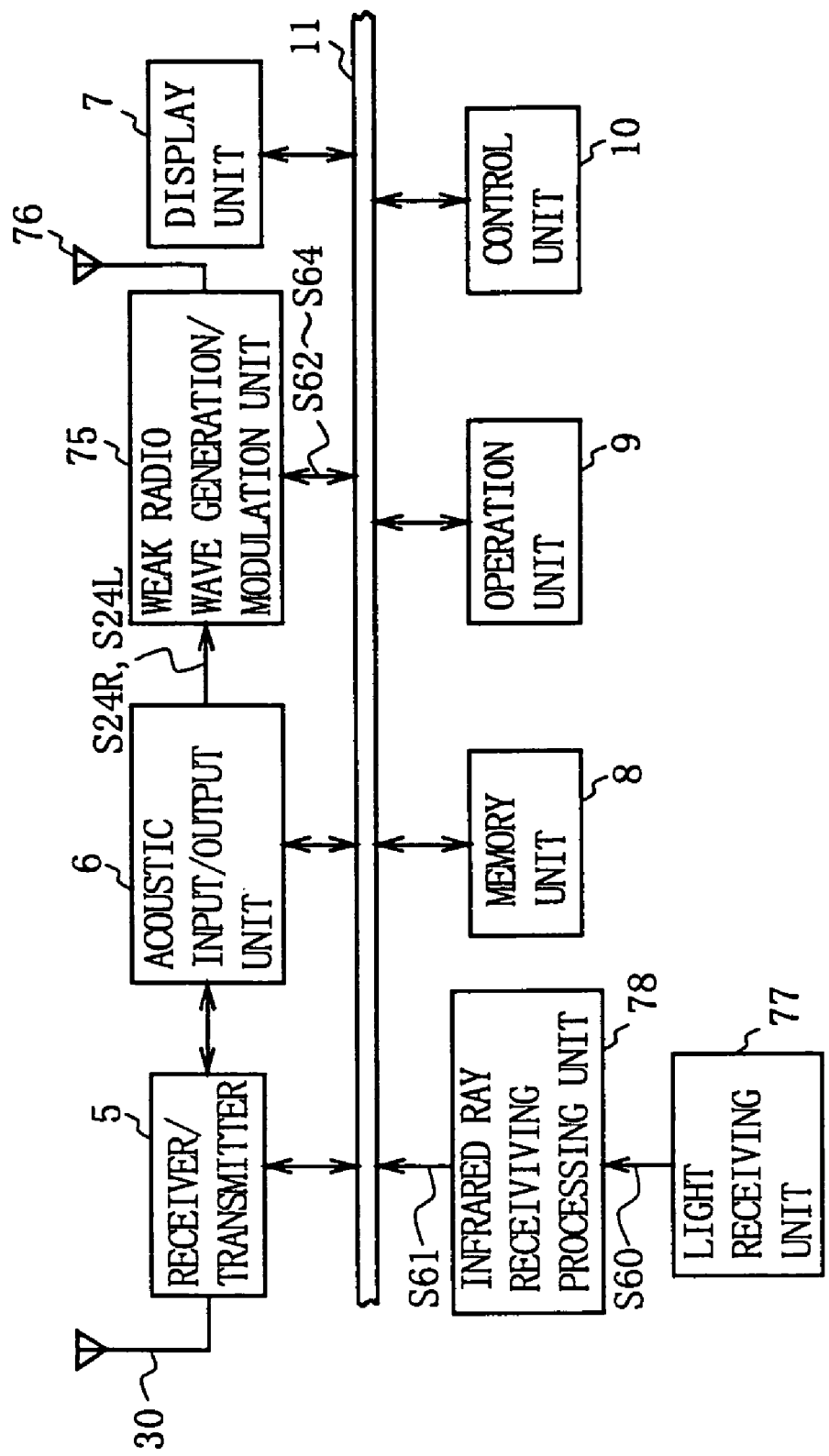
FIG. 19 is a block diagram showing the construction of an acoustic receiver device according to the second embodiment.

At this point, the construction of the acoustic receiver device 70 according to the second embodiment will be shown in FIG. 19. In FIG. 19, in which the corresponding parts of FIG. 2 are designated the same reference numerals, 70 generally shows an acoustic receiver device according to the second embodiment, and in the case of this acoustic receiver device, a weak radio wave generation/modulation unit 75, an antenna for weak radio wave 76, an infrared ray receiving unit 77 and an infrared ray receiving processing unit 78 are newly provided in addition to the case of the acoustic receiver device 4 according to the first embodiment.

The infrared ray receiving unit 77 receives the infrared ray to be transmitted from the remote controller 74 and generates an radio electric signal S60 corresponding to the light quantity of the infrared ray or the number of optical pulse. The infrared ray receiving processing unit 78, analyzing the radio signal S60, detects the control data S61 transmitted from the remote controller 74 and outputs this to the control unit 10 via the data bus 11.

The control unit 10 controls the operation of each unit of the acoustic receiver device 70 corresponding to the control data S61 and thus, the operation of the acoustic receiver device 70 can be controlled by using the remote controller 74. For example, in the case where the control data to start the music offering service with the prescribed mode is transmitted from the remote controller 74, the control unit 10 controls the operation of the receiver/transmitter unit 5 responding to that control data and transmits service request signal S20 via the receiver/transmitter unit 5. With this arrangement, the service center 2 sends out the music data by the user desired mode responding to this service request signal S20. The acoustic receiver device 70 receives the signal transmitted via the PHS wireless circuit by the receiver/transmitter unit 5, and by decoding processing that music data received at the acoustic input/output unit 6, restores the music data (S24R, S24L) transmitted from the service center 2 and sends this out to the weak radio wave generation/modulation unit 75.

The weak radio wave generation/modulation unit 75, after forming the transmission signal by applying the FM modulation to the supplied music data (S24R, S24L), converts the transmission signal to the frequency band of FM radio broadcasting and transmits this from the antenna 76 using weak radio wave. Thus, if this weak radio wave is received by the radio receiver of the vehicle loaded acoustic equipment, the music data received by the acoustic receiver device 70 can be transmitted via the vehicle loaded acoustic equipment.

Furthermore, the control unit 10 also transmits add-on information S62 such as music names and music words transmitted with the music data and the menu screen data S63 to be displayed on the display unit 7 through the weak radio wave generation/modulation unit 75, and if these are received by the vehicle loaded acoustic equipment, the data connected with the music offering service such as music names and music words or menu screen can be displayed on the display unit 71 of the vehicle loaded acoustic equipment.

Furthermore, since the control unit 10 transmits the control data S64 connected with the vehicle loaded acoustic equipment received via the infrared ray receiving unit 77 and the infrared ray receiving processing unit 78 through the weak radio generation modulation unit 75, the operation of the vehicle loaded acoustic equipment can be controlled by using the remote controller 74.

According to the foregoing construction, since the music data received are RM modulated again and transmitted using the weak radio wave, the music data received at the acoustic receiver device 70 can be transmitted via the existing vehicle loaded acoustic equipment with high quality and high output power, the convenience in the case of receiving the music offering service can be further improved.

(3) The Third Embodiment

The first embodiment described above has dealt with the case of transmitting the music data received at the acoustic receiver device 4 via the cable connected earphone 13. However, in this third embodiment, we will explain the case where the music data can be heard by using the wireless type earphone.

Figure 20:
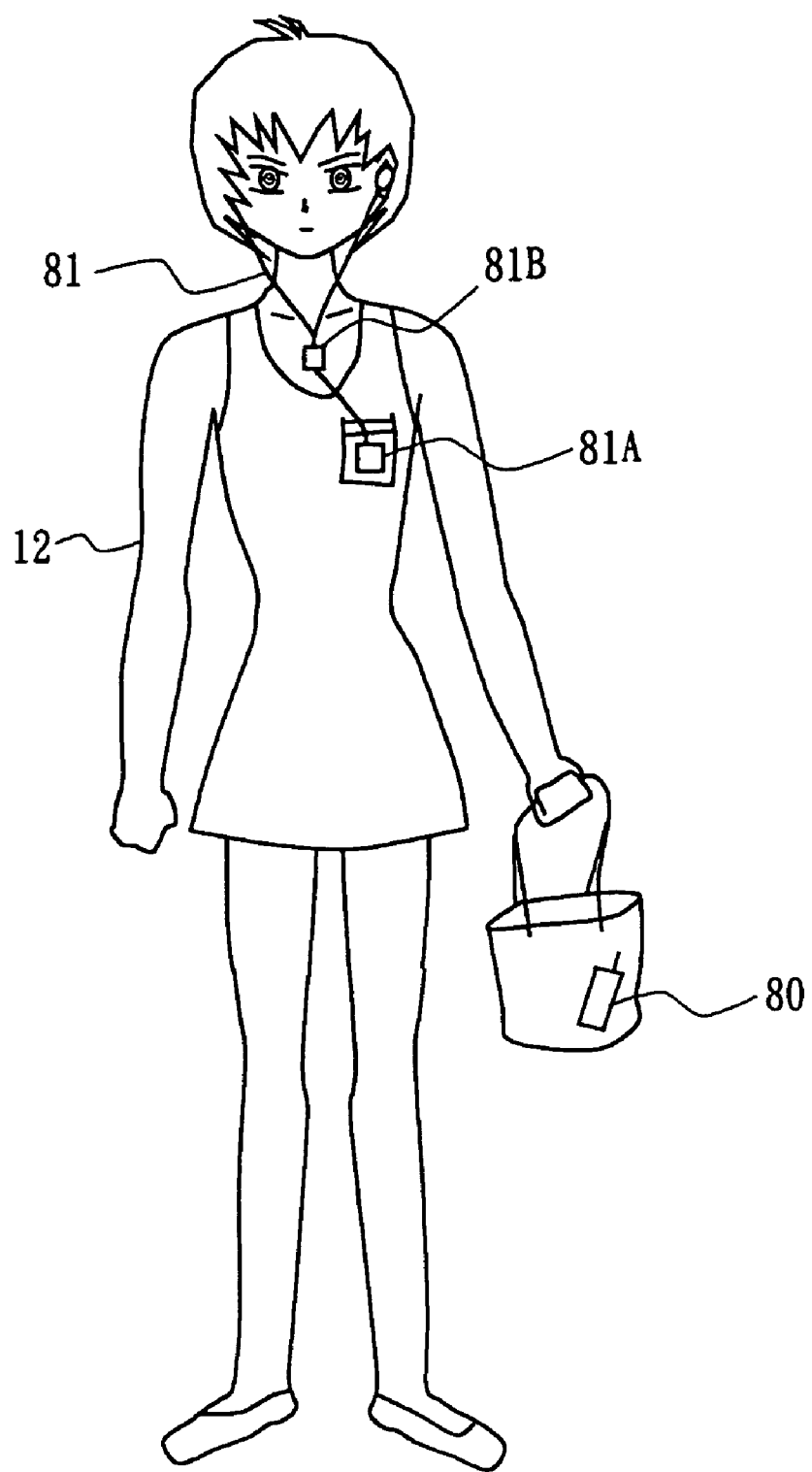
FIG. 20 is a sketch showing the usage pattern of an acoustic receiver according to the third embodiment.

As shown in FIG. 20, in this third embodiment, the music data received at the acoustic receiver device 80 is re-modulated and transmitted using the weak radio wave, and by receiving this at the communication unit 81A of the wireless type earphone 81, the audio data is transmitted via the electro-acoustic transform element of the earphone 81.

Thus, in this third embodiment, the acoustic receiver device 80 and the earphone 81 can be used separately, and if the acoustic receiver device 4 is kept in a bag not attaching to the body as in the case of the first embodiment, the music data can be easily heard.

Moreover, according to the first embodiment, it is possible that the acoustic receiver device 4 can be put in the bag. However, since it is cable connected, it can be separated only for the cable length of the earphone 13. Moreover, in the case of the first embodiment, if the user walks around carrying the acoustic receiver device 4 with him, it is possible that the cable of the earphone 13 hangs on his hand and becomes an obstacle. However, if the acoustic receiver device 80 and the earphone 81 are wireless connected as in the case of the third embodiment, they can be separated freely within the range as long as radio wave reaches and since the earphone 13 is wireless connected, there is no chance that the cable of the earphone 13 becomes an obstacle as in the case of the first embodiment, and greater flexibility can be obtained.

Furthermore, according to the third embodiment, a remote operator 81B is provided at midpoint of the cable of the earphone 81, and the control data entered from this remote operator 81B can be transmitted via the communication unit 81A. Thus, the control data when receiving the music offering service can be entered by the user on hand without operating the operation unit 9 provided in the main unit of the acoustic receiver device 80. This remote operator 81B has the construction similar to that of the remote operator 14 described in the first embodiment, and has a display facility and an operational input facility. Needless to say, the communication unit 81A and the remote operator 81B can be formed integratedly.

Figure 21:
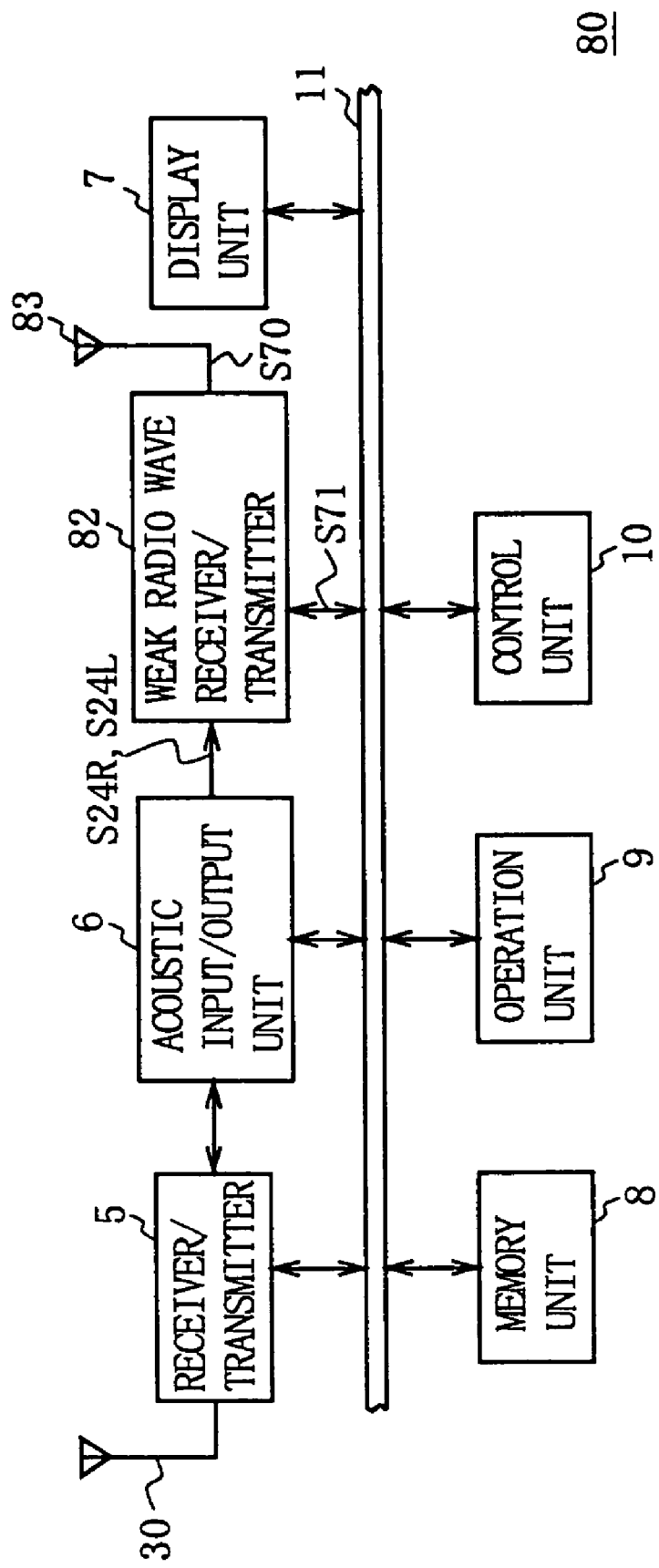
FIG. 21 is a block diagram showing the construction of the acoustic receiver according to the third embodiment.

At this point, the construction of the acoustic receiver device 80 according to the third embodiment will be shown in FIG. 21. In FIG. 21, in which the corresponding parts of FIG. 2 are given the same reference numerals, 80 generally shows the acoustic receiver device according to the third embodiment, and a weak radio wave receiver/transmitter unit 82 and an antenna for weak radio wave 83 are newly provided in this acoustic receiver device in addition to the acoustic receiver device 4 according to the first embodiment.

In this acoustic receiver device 80, the transmission signal transmitted from the communication unit 81A of the wireless type earphone 81 is received by the antenna 83, and the resultant receiving signal S70 is supplied into the weak radio wave receiver/transmitter unit 82. The weak radio wave receiver/transmitter unit 82, by applying the predetermined demodulation processing to this receiving signal S70, restores the control data S71 generated by the remote operator 81B from the receiving signal S70 and transmits this to the control unit 10 via the data bus 11.

If this control data S71 is the control data to receive the music offering service, the control unit 10 transmits the service request signal S20 for receiving the music offering service corresponding to the control data S71 to the service center 2 using the receiver/transmitter unit 5 via the PES wireless circuit. Upon receiving this, the service center 2 transmits the desired music data in response to the service request signal S20 via the PHS wireless circuit.

In the acoustic receiver device 80, the signal transmitted via the PES wireless circuit is received by the receiver/transmitter unit 5, and by decoding processing the music data received at the acoustic input/output unit 6, the music data (S24R, S24L) transmitted from the service center 2 is restored and transmitted to the weak radio wave receiver/transmitter unit 82.

The weak radio wave receiver/transmitter unit 82, after forming the transmission signal by applying the predetermined modulation processing to the music data (S24R, S24L) supplied, transforms the transmission signal to such a signal of approximately several hundreds MHz and transmits this using the weak radio wave from the antenna 83. Thus, if this weak radio wave is received by the communication unit 81A of the earphone 81 and the music data is demodulated and the music data is transmitted via the electro-acoustic transform element of the earphone 81, the music data received by the acoustic receiver device 80 can be easily heard by the wireless earphone 81.

Furthermore, the weak radio wave receiver/transmitter unit 82 also transmits the data regarding the music data to be received such as music names and music words or the data of menu screen using the weak radio wave. Accordingly, if these are received by the wireless type earphone 81 and displayed on the remote operator 81B, the user can easily confirm the music names and music words without seeing the display unit 7 provided in the main unit of the acoustic receiver device 80.

Figure 22:
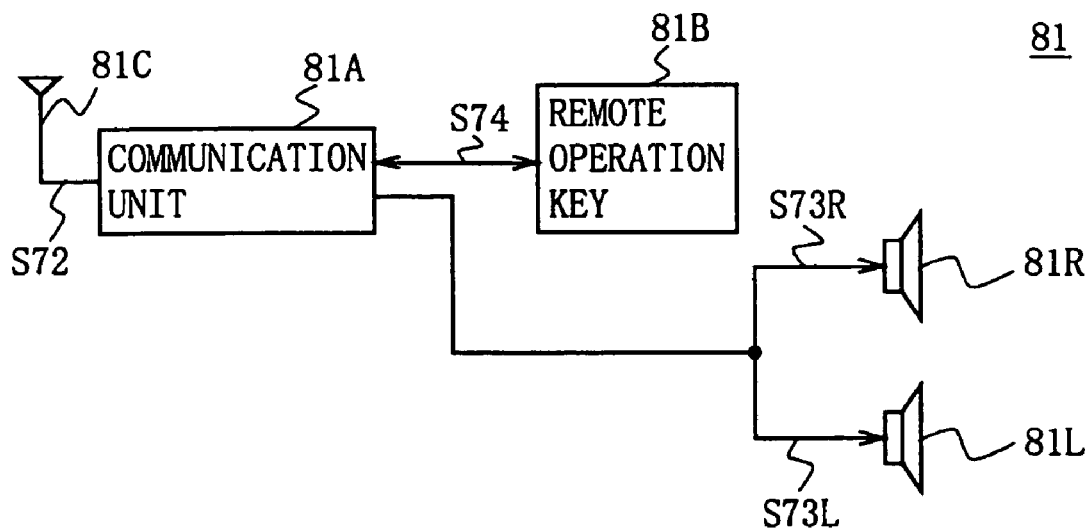
FIG. 22 is a block diagram showing the construction of the wireless earphone according to the third embodiment.

At this point, the construction of the wireless type earphone 81 will be shown in FIG. 22. As shown in this FIG. 22, the wireless type earphone 81 is roughly comprised of a communication unit 81A, a remote operator 81B, an antenna 81C and electro-acoustic transform elements 81R, 81L. In the wireless type earphone 81, the weak radio wave transmitted from the weak radio wave receiver/transmitter unit 82 of the acoustic receiver device 80 is received by the antenna 81C and the resultant receiving signal S72 is supplied to the communication unit 81A. The communication unit 81A, applying the predetermined demodulation processing, restores stereophonic music signals S73R and S73L from the receiving signal S72 and outputs this to the electro-acoustic transform elements 81R and 81L. Thus, if the user puts these electro-acoustic transform elements 81R, 81L to his ear, he can hear music via the electro-acoustic transform elements 81R and 81L.

On the other hand, the control data S74 entered by the user operating the remote operator 81B is supplied to the communication unit 81A. The communication unit 81A, after forming the transmission signal applying the predetermined modulation processing to this control data 74, transforms the transmission signal to signal of approximately several hundreds MHz and transmits this from the antenna 81C using the weak radio wave. Then, upon receiving this weak radio wave, if the control data S71 is restored, the operation corresponding to the user's instruction can be conducted based on this control data S71.

According to the construction described above, since the music data received is re-modulated and transmitted using the weak radio wave, the music data received by the acoustic receiver device 80 can be heard by the wireless type earphone 81, the convenience in the case of receiving the music offering service can be further improved.

(4) Other Embodiments

The first and the third embodiment described above have dealt with the case of using the earphone as the sound output means for outputting the music data received. However, the present invention is not only limited to this, but also if the sound output means which covers the user's ear, i.e., a headphone would be used, the same effect as those of the above can be obtained.

Furthermore, the second embodiment described above has dealt with the case of setting the frequency of weak radio wave over which the music data is piled to approximately 76 MHz to 90 MHz. However, the present invention is not only limited to this but also other frequency can be used, provided that the frequency is the frequency within the range receivable by the radio receiver loaded as the vehicle loaded acoustic equipment.

Furthermore, the third embodiment described above has dealt with the case of setting the frequency of weak radio wave over which the music data is piled to approximately several hundreds MHz. However, the present invention is not only limited to this but also any frequency can be used, provided that the frequency is over several tens MHz and lower than 1 GHz. If the frequency is set within this range, the communication using the weak radio wave can be easily conducted.

Moreover, the first and the third embodiments described above have dealt with the case of transmitting the received audio data via the earphone 13 or 81. However, the present invention is not only limited to this but also the earphone which is the electro-acoustic transform element can be used as the microphone and audio signal for telephone call may be entered via the earphone. In general, the electro-acoustic transform element forming the earphone can be converted to the electric signal by picking up vibrations of the voice wave inversely. More specifically, the voice wave generated at the human vocal cord reaches into ear generally passing through such as bones, however, if the vibrations of voice wave are received by the earphone, audio signal can be formed by the earphone. And if this audio signal is entered to the acoustic input/output unit 6 of the acoustic receiver device 4 or 80 via the cable or the wireless circuit as in the case of the first or the third embodiment, the earphone can be used as a microphone and when using the acoustic receiver device 4 or 80 as the telephone terminal, the user can make a call without carrying the mike and great flexibility can be obtained. In this case, the transmission of the audio signal to output to the earphone and the audio signal entered from the earphone may be conducted by semi-duplex communications, however, if the audio signal is transmitted by full duplex communications by time sharing transmission, the responsiveness of the telephone conversation is improved and this is more effective.

Furthermore, the first embodiment described above has dealt with the case of applying the discrete cosine transform to the music data in the data processing unit 40 when transmitting the music data from the PES base station 3. However, the present invention is not only limited to this but also such as high speed Fourier transform (FFT) and the other processing can be applied. In this connection, in the case of conducting the high speed Fourier transform processing at the transmitting end, the inverse high speed Fourier transform (IFFT) may be conducted at the data decoding block 62 of the receiving end in place of the discrete cosine transform.

Furthermore, the first embodiment described above has dealt with the case of memorizing data of the menu screen in the memory unit 8. However, the present invention is not only limited to this but also if the data of this menu screen may be transmitted from the service center 2 side via the PHS wireless circuit, the same effect as those of the above can be obtained.

Furthermore, the first embodiment described above has dealt with the case of classifying the music to be offered in the random mode into nine categories as shown in FIG. 10, i.e., "the latest best ten (J-POP)", "the latest best-ten (Rock)", "the latest best-ten (Enka)", "random pickup (1990s)", "random pickup (1980s)", "random pickup (1960–1970s)", "jazz random", "classic random" and "reggae random". However, the present invention is not only limited to this but also the music can be classified into more precise categories according to era and genre. In short, as the classification of the music group, any other classifications other than the classification shown in FIG. 10 can be used.

Moreover, the first embodiment described above has dealt with the case of forming a virtual character table TB with fifty Japanese phonetic characters and thus enabling the Japanese kana characters input. However, the present invention is not only limited to this but also the virtual character table may be formed with the other characters enabling to input other characters.

Furthermore, the first embodiment described above has dealt with the case of enabling the virtual cursor K movable up and down and right and left directions by using "5", "0", "7" and "9" keys since the virtual character table TB extending toward two-dimensional direction is used. However, the present invention is not only limited to this but also by making the virtual cursor movable only up and down or left and right by using "5" and "0" keys or "7" and "7" keys and the virtual cursor may be moved only from "A" to "Z" direction or from "Z" to "A" direction in the case of using the virtual character table on which characters are arranged one dimensionally such as alphabet.

Furthermore, the first embodiment described above has dealt with the case of receiving the music code by outputting the service request signal S20 showing the music confirmation after the user selecting the desired music from the music name list and confirming the music when specifying the music by the program mode. However, the present invention is not only limited to this but also the music code can be transmitted with the music name when transmitting the music name list from the service center 2. With this arrangement, the processings of steps P6 and P7 of the flow chart shown in FIG. 14 can be omitted and the processing can be further simplified.

Furthermore, the first embodiment described above has dealt with the case of showing the music words display screen by displaying a book mark as well as showing the music name display screen by displaying a music code mark. However, the present invention is not only limited to this but also the music name display screen or the music word display screen can be indicated by displaying the character such as "music name" and "music word".

Moreover, the first embodiment described above has dealt with the case of obtaining the music signal of the user specified music after memorizing the music name file showing the music specified by the program mode in the memory unit 8, and reading out the music code showing the user specified music from the music name file and by informing this to the service center 2. However, the present invention is not only limited to this but also a timer for specifying the time when the music code is read out from the music name file memorized in advance may be provided and when the time registered in this timer comes, the music code may be read out and reported to the service center 2. If the user registers the desired time on the timer in advance, he can automatically receive the music signal and can hear the desired music when that time comes.

Furthermore, the first embodiment described above has dealt with the case of instructing the music offering service stop by using the telephone call end key at the time when receiving the music offering service in the random mode. However, the present invention is not only limited to this but also the music offering service stop can be allocated to such as the numeric key.

Figures 23A, 23B:
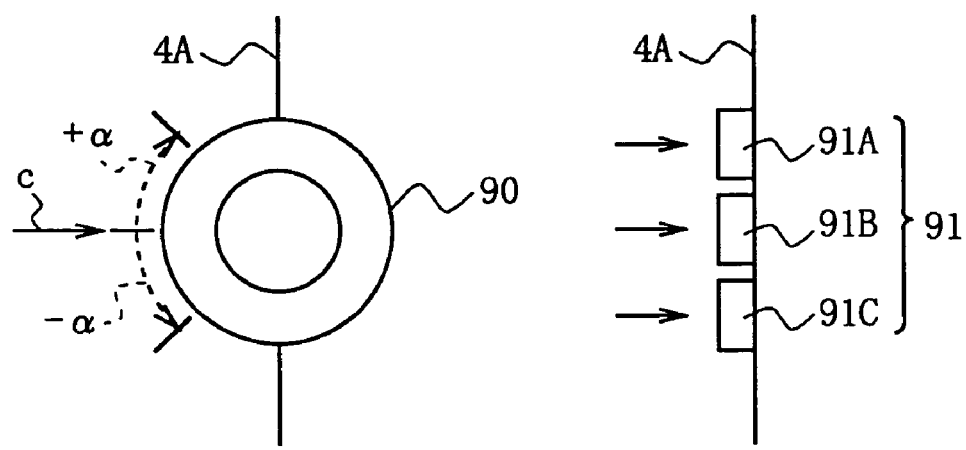
FIGS. 23A and 23B are schematic diagram showing the operation keys according to other embodiment.

Furthermore, the first embodiment described above has dealt with the case of providing a rotary push type operation key, i.e., jog dial 9D and moving a cursor. However, the present invention is not only limited to this but also the cursor can be moved by providing the other kind operation key. For example, as shown in FIG. 23A, providing a rotary push type operation key 90 which can be push operated in a direction almost perpendicular to the main unit 4A, and the cursor travel may be conducted. In this case, the operation key 90 can rotate up and down for an angle ±α and when the user releases his finger from the rotating condition, it returns to the original position according to its spring tension. When this operation key 90 is rotated for the angle +α or −α by the user, of two switches one switch corresponding to the direction of rotation is put ON condition. The control unit 10 detects the direction of rotation of the operation key 90 by detecting the switch condition and simultaneously detects the time during which the switch is on condition, and moves the cursor displayed on the display unit 7 for the amount corresponding to the direction and duration of the rotation detected upward and downward. Thus, the cursor can be easily moved without pushing the numeric key as in the case of the first embodiment. Furthermore, this operation key 90 can be push operated in the direction shown by an arrow "c". When this operation key 90 is push operated, a switch signal showing the push operation has been done is generated. The control unit 10 can detect the push operation of the operation key 90 by detecting this switch signal, and when the control unit detects the push operation, confirms the item on which the cursor is displayed. Thus, the item on which the cursor is placed can be easily confirmed without pushing the "#" key as in the case of the embodiment described above.

Furthermore, the present invention is not only limited to the above but also, as shown in FIG. 23B, the cursor travel can be conducted by providing a 3-piece switch type operation key 91. In this case, the operation key 91 is comprised of vertically arranged three switches 91A to 91C. The control unit 10 can detect the switch condition of these three switches 91A to 91C, and as well as moving the cursor corresponding to the detection result, conducts the confirmation of the item on which the cursor is positioned. More specifically, when the first switch 91A is push operated, the control unit 10 measures the time during which the first switch 91A is pushed and moves the cursor upward for the amount corresponding to that time. Also, when the third switch 91C is push operated, the control unit 10 measures the time during which the third switch is pushed and moves the cursor downward for the amount corresponding to that time. With this arrangement, the cursor can be easily moved without pushing the numeric key as in the case of the embodiment described above. Furthermore, when the second switch 91B is push operated, the control unit 10 detects the push condition of the second switch 91B and confirms the item on which the cursor is positioned. Thus, the item on which the cursor is positioned can be easily confirmed without pressing the "#" key as in the case of the embodiment described above. Accordingly, if the rotary push type operation key 90 or a 3-piece switch type operation key 91 is provided, the operability and productivity of the acoustic receiver device can be also improved.

Furthermore, the embodiment described above has dealt with the case of conducting the music offering service to the user by transmitting the music signal from the service center 2. However, the present invention is not only limited to this but also other information, such as news, stock information, or weather forecast can be transmitted from the service center 2. In short, if the acoustic signal for offering information such as music and sound would be transmitted from the service center, the same effect as those of the above can be obtained.

Moreover, the embodiment described above has dealt with the case of transmitting music signal via the PHS wireless circuit. However, the present invention is not only limited to this but if the music signal would be transmitted via the wireless circuit of the other wireless communication system such as the portable telephone system and car telephone system, the same effect as those of the above can be obtained.

Furthermore, the embodiment described above has dealt with the case of providing 2 electro-acoustic transform elements for outputting the acoustic signal received and outputting the stereo sound. However, the present invention is not only limited to this but providing at least two or more electro-acoustic transform elements and outputting the acoustic signal, the same effect as those of the above can be obtained.

Furthermore, the embodiment described above has dealt with the case of transmitting the service request signal via the wireless transmission unit 5A and receiving the music signal responding to this at the wireless receiving unit 5B, and after modulation processing that received signal at the demodulation circuit 40, restoring the music signal by decoding processing at the data processing circuit 43 and outputting this via the earphone 13. However, the present invention is not only limited to this but if the wireless transmission means for transmitting the service request signal to request the desired acoustic signal, the wireless receiving means for receiving the transmission signal containing the acoustic signal to be transmitted responding to the service request signal, the demodulation decoding means for applying the demodulation and/or decoding processing to the receiving signal to be transmitted from the wireless receiving means, and the electro-acoustic transforming means for transforming the acoustic signal restored by the demodulation decoding means to the music wave and transmitting this would be provided, the user desired acoustic signal can be easily obtained not having the recording medium in which the acoustic signal is recorded as in the case of the embodiment described above.

According to the present invention as described above, since the service request signal is transmitted and the acoustic signal transmitted responding to this is received and transmitted, the user desired acoustic signal can be easily obtained without having the recording medium in which acoustic signal is recorded. Moreover, since the predetermined modulation and/or coding processing is applied to the acoustic signal at the transmitting end and this is demodulated and/or decoding processed at the receiving end, the acoustic signal having high quality can be constantly obtained even if the circuit condition changes. Thus, upon further improving the convenience, acoustic signal can be offered.

Furthermore, since the acoustic signal received is re-modulated and retransmitted, it becomes unnecessary to connect the element for outputting the sound signal and the device for receiving the sound signal by the cable, the usability can be improved.

Moreover, since the electro-acoustic transform element for transmitting the acoustic signal received is used as the element for forming the audio signal when the telephone call is in progress, one element can be used commonly and the usability can be improved.

Furthermore, since the contents of the input signal to be transmitted are changed based on the contents of the data transmitted from the terminal device, the input signal desired by the terminal device can be easily transmitted.

Furthermore, since when the request signal is the first type signal, music selections are transmitted in the order predetermined by the transmitting end and when the request signal is the second type signal, an optional music is selected and transmitted from among the prescribed music group, the desired music can be offered according to the type of request signal.

Moreover, since the musics are transmitted in the order predetermined by the transmitting end when the request signal is the first type signal and when the request is the second type signal, the music determined by the terminal device side is transmitted, the desired music can be provided according to the request signal.

Moreover, by receiving the music signal corresponding to the request signal, extracting the add-on information transmitted with the music signal from the receiving signal received and selectively displaying the first type add-on information and the second type add-on information out of add-on information, the add-on information transmitted with the music signal can be selectively confirmed, and the usability can be improved.

Furthermore, since the information on which the virtual cursor is positioned is displayed by the virtual cursor moving on the two-dimensional virtual information table according to the input operation and the information on which the virtual cursor is positioned is selected when the confirmation instruction is put in, the desired information can be easily selected.

Furthermore, since the virtual cursor moves on the two-dimensional character table according to the input operation, the letter on which the cursor is position is displayed and when the confirmation is put in, the letter on which the virtual cursor is positioned is selected and entered, the desired characters can be easily entered.

Moreover, since the unit data pairing the music name with the music code added to the music are arranged in the desired order and the time sharing order of the musics is determined according to that order, music names and music codes are easily obtained and simultaneously the order of musics can be easily grasped.

Moreover, since the material information for music specification is transmitted via the predetermined communication circuit, the music list regarding the material information is received via the communication circuit, the desire music is specified from among the music list, and the information showing the music specified is transmitted via the communication circuit, the music existing in the other party side can be easily specified via the communication circuit.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A wireless acoustic receiving device, comprising:
  wireless transmission means for transmitting a service request signal to request an acoustic signal desired by a user;
  wireless receiving means for receiving a transmission signal containing the acoustic signal transmitted in response to the service request signal;
  demodulation/decoding means for applying demodulation and/or decoding processing to the signal received by wireless receiving means and restoring the received signal to an acoustic signal; and electro-acoustic transform means for transforming the acoustic signal restored by the demodulation/decoding means to a sound wave for output to the user, wherein the demodulation/decoding means comprises:

decoding means for separating main information and sub information from the signal received by the wireless receiving means;

feature information restoring means for restoring feature information from the sub information;

information restoring means for conducting the restoration processing of the main information using the feature information restored by the feature information restoring means; and information source decoding means for restoring the acoustic signal upon decoding an output signal of the information restoring means.

2. The wireless acoustic receiving device according to claim 1, wherein the electro-acoustic transform means is formed of at least two or more electro-acoustic transform elements and outputs the acoustic signal in stereo sound.

3. The wireless acoustic receiving device according to claim 1, wherein the demodulation/decoding means further comprises deinterleave means for returning a data order of the main information to an initial state.

4. The wireless acoustic receiving device according to claim 1, wherein the information source decoding means decodes the acoustic signal by conducting discrete cosine inverse transform processing on the output signal of the information restoring means.

5. The wireless acoustic receiving device according to claim 1, wherein the information source decoding means restores the acoustic signal by conducting inverse high-velocity Fourier transform processing on the output signal of the information restoring means.

6. A vehicle-loaded acoustic device, comprising:

wireless transmission means for transmitting a service request signal to request an acoustic signal desired by a user;

wireless receiving means for receiving a transmission signal containing the acoustic signal transmitted in response to the service request signal;

demodulation/decoding means for restoring the acoustic signal by applying demodulation and/or decoding processing to the signal received by the wireless receiving means;

electro-acoustic transform means having at least two electro-acoustic transform elements for transforming the acoustic signal restored by the demodulation/decoding means to a sound wave output in stereo sound;

display means for displaying information concerning the acoustic signal received by the wireless receiving means; and present position locating means in which the information concerning the acoustic signal received by the wireless receiving means and information concerning the present position locating means are one of simultaneously and alternately displayed on the display means.

7. The vehicle-loaded acoustic device according to claim 6, further comprising remote control means in which control data for operation control is entered through the remote control means.

8. The vehicle-loaded acoustic device according to claim 7, wherein the remote control means transmits the control data via infrared ray.

9. The vehicle-loaded acoustic device according to claim 6, further comprising:

television broadcasting receiving means in which the information concerning the acoustic signal received by the wireless receiving means arid images of television broadcasting received at the television broadcasting receiving means are one of simultaneously and alternately displayed on the display means.

10. The vehicle-loaded acoustic device according to claim 6, wherein the wireless transmission means, the wireless receiving means and the demodulation/decoding means include removable components and the removable components are used as communication equipment upon being removed.

11. A portable acoustic output device, comprising:

wireless transmission means for transmitting a service request signal to request an acoustic signal desired by a user;

wireless receiving means for receiving a transmission signal containing the acoustic signal transmitted in response to the service request signal;

demodulation/decoding means for restoring the acoustic signal upon applying demodulation and/or decoding processing to the signal received by the wireless receiving means;

electro-acoustic transform means having at least two electro-acoustic transform elements for transforming the acoustic signal restored by the demodulation/decoding means to a sound wave output in stereo sound, wherein the electro-acoustic transform element possessed by the electro-acoustic transform means is human body attachable;

a battery for powering said wireless transmission means and said wireless receiving means;

operating means for inputting control data in the case of receiving the acoustic signal; and a main unit case and a cable, wherein the electro-acoustic transform means is connected via the cable to the main unit case in which the wireless transmission means, the wireless receiving means, and the demodulation/decoding means are stored, and the operating means is connected along a length of the cable.

12. The portable acoustic device according to claim 11, wherein the operating means comprises operation keys for inputting the control data regarding telephone communications.

13. The portable acoustic output device according to claim 11, wherein the operating means comprises rotary push type operation keys.

14. The portable acoustic output device according to claim 11, wherein the operating means comprises moving round push type operation keys.

15. The portable acoustic output device according to claim 11, wherein the operating means comprises a plurality of pushing switches.

16. The portable acoustic output device according to claim 11, further comprising display means for displaying information regarding the acoustic signal received by the wireless receiving means.

17. The portable acoustic output device according to claim 16, wherein the display means also displays information regarding telephone conversation.

18. The portable acoustic output device according to claim 16, wherein the display means is formed integrally with the operating means.

19. The portable acoustic output device according to claim 16, further comprising:
weak information transmission means for transmitting the acoustic signal restored by the demodulation/decoding means; and
weak information receiving means for receiving the acoustic signal transmitted by the weak information transmission means and for supplying a received signal to the electro-acoustic transform means wherein
the acoustic signal is supplied to the electro-acoustic transform means via a wireless connection.

20. The portable acoustic output device according to claim 19, wherein the weak information transmission means transmits the acoustic signal using an electromagnetic wave.

21. The portable acoustic output device according to claim 20, wherein the electromagnetic wave is in the frequency band over 10 MHz and below 1 GHz.

22. The portable acoustic output device according to claim 20 further comprising control means, wherein
the weak information receiving means transmits control data input from the operating means utilizing the electromagnetic wave, and the weak information transmission means receives the control data transmitted from the weak information receiving means for output to the control means.

23. An automobile comprising:
wireless transmission means for transmitting a service request signal to request an acoustic signal desired by a user;
wireless receiving means for receiving a transmission signal containing the acoustic signal transmitted in response to the service request signal;
demodulation/decoding means for restoring the acoustic signal by applying demodulation and/or decoding processing to the signal received by the wireless receiving means;
electro-acoustic transform means having at least two electro-acoustic transform elements for transforming the acoustic signal restored by the emodulation/decoding means to a sound wave for output in stereo sound;
display means; and
present location locating means, wherein information regarding the acoustic signal received by the wireless receiving means and information concerning the present position locating means are one of simultaneously and alternately displayed on the display means.

24. An information transmission device comprising:
information source coding means for information source coding an input signal fed thereto;
feature extracting means for extracting feature information included in the input signal;
quantization means for vector quantizing an output signal of the information source coding means using the feature information extracted by the feature extracting means;
modulation means for modulating an output signal of the quantization means;
wireless transmission means for transmitting an output signal of the modulation means to a terminal device;
wireless receiving means for receiving an output signal from the terminal device; and
demodulation means for applying demodulation and/or decoding processing to the signal received by the wireless receiving means wherein
contents of the input signal are changed based on an output signal of the demodulation means.

25. The information transmission device according to claim 24, further comprising:
interleave means for sorting output data from the information source coding means; and
weight function forming means for forming a weight function from the feature information extracted by the feature information extracting means.

26. The information transmission device according to claim 24, wherein
the information source coding means performs discrete cosine transform processing on the input signal.

27. The information transmission device according to claim 24, wherein
the information source coding means performs high velocity Fourier transform processing on the input signal.

28. An information transmission method, comprising the steps of:
information source coding an input signal and extracting feature information contained in the input signal;
conducting vector quantization of an output from the step of information source coding utilizing the extracted feature information;
modulating an output signal from the step of vector quantization for transmitting to a terminal device;
receiving a transmission signal from the terminal device; and
restoring data in the signal transmitted from the terminal device after applying demodulation and/or decoding processing to the signal and changing contents of the input signal based on contents of the restored data.

29. The information transmission method according to claim 28, comprising a further step of performing discrete cosine transform processing on the input signal as the step of information source coding.

30. The information transmission method according to claim 28, comprising the further step of performing high velocity Fourier transform processing on the input signal as the step of information source coding.

* * * * *